US010203766B2

(12) United States Patent
Youn et al.

(10) Patent No.: US 10,203,766 B2
(45) Date of Patent: Feb. 12, 2019

(54) DISPLAY APPARATUS FOR VEHICLE

(71) Applicant: LG ELECTRONICS INC., Seoul (KR)

(72) Inventors: Jinho Youn, Seoul (KR); Jaehyeuck Choi, Seoul (KR); Hyokune Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/496,107

(22) Filed: Apr. 25, 2017

(65) Prior Publication Data

US 2017/0308173 A1  Oct. 26, 2017

(30) Foreign Application Priority Data

Apr. 25, 2016  (KR) .......................... 10-2016-0050299

(51) Int. Cl.
*G06F 3/01* (2006.01)
*B60K 35/00* (2006.01)
(Continued)

(52) U.S. Cl.
CPC .............. *G06F 3/017* (2013.01); *B60K 35/00* (2013.01); *B60K 37/06* (2013.01); *G01J 1/0411* (2013.01); *G01V 8/20* (2013.01); *G01V 8/24* (2013.01); *G06F 3/0421* (2013.01); *B60K 2350/1052* (2013.01); *G06F 2203/04101* (2013.01)

(58) Field of Classification Search
CPC ................... G06F 3/017; G06F 3/0421; G06F 2203/04101; B60K 37/00; B60K 2350/20; B60K 2350/1052; B60K 2350/1012; G01J 1/0411; G01V 8/24; G01V 8/20

See application file for complete search history.

(56) References Cited

U.S. PATENT DOCUMENTS

2010/0277696 A1\* 11/2010 Huebner ................ B60K 35/00
352/81
2011/0080490 A1\* 4/2011 Clarkson ................. G06F 3/017
348/222.1
(Continued)

FOREIGN PATENT DOCUMENTS

EP          2937765     10/2015
JP         2008265511   11/2008
(Continued)

OTHER PUBLICATIONS

Extended European Search Report in European Application No. 17167466.6, dated Sep. 4, 2017, 9 pages (with English translation).

*Primary Examiner* — Ibrahim A Khan
(74) *Attorney, Agent, or Firm* — Fish & Richardson P.C.

(57) ABSTRACT

Disclosed is display apparatus for a vehicle including a display unit, a gesture sensing unit located around the display unit for sensing a 3D gesture made by an object, and a processor for generating a control signal based on the 3D gesture. The gesture sensing unit includes a first light-emitting unit for emitting a first group of rays along a first optical path, a second light-emitting unit for emitting a second group of rays along a second optical path, and a light-receiving unit for receiving a first group of reflected rays formed when the first group of rays is reflected by the object and a second group of reflected rays formed when the second group of rays is reflected by the object.

19 Claims, 32 Drawing Sheets

(51) Int. Cl.
*G01V 8/20* (2006.01)
*G01V 8/24* (2006.01)
*G01J 1/04* (2006.01)
*G06F 3/042* (2006.01)
*B60K 37/06* (2006.01)

(56) References Cited

U.S. PATENT DOCUMENTS

| | | | |
|---|---|---|---|
| 2011/0221696 A1 | 9/2011 | Wäller et al. | |
| 2013/0293722 A1* | 11/2013 | Chen | F21V 14/02 |
| | | | 348/164 |
| 2014/0081521 A1* | 3/2014 | Frojdh | G06F 3/017 |
| | | | 701/36 |
| 2016/0334883 A1* | 11/2016 | Kim | G06F 3/0304 |

FOREIGN PATENT DOCUMENTS

| | | |
|---|---|---|
| KR | 101195896 | 11/2012 |
| KR | 10-2016-0036242 | 4/2016 |

* cited by examiner

FIG. 18
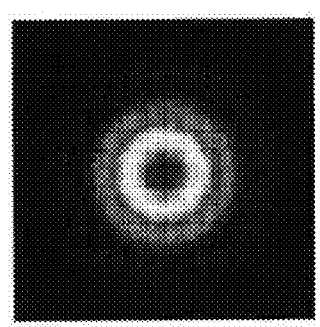 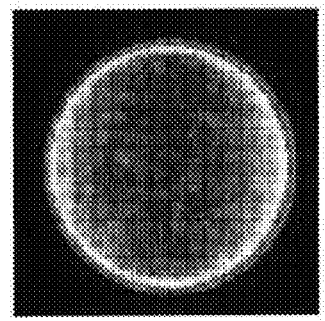
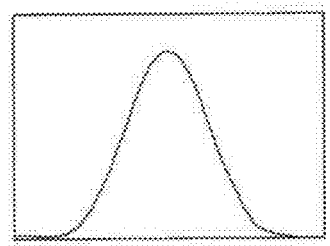 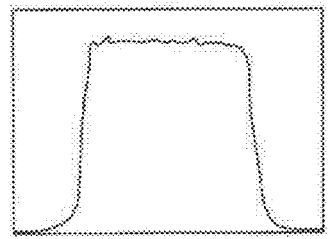
(a)              (b)

(a)          (b)

FIG. 20
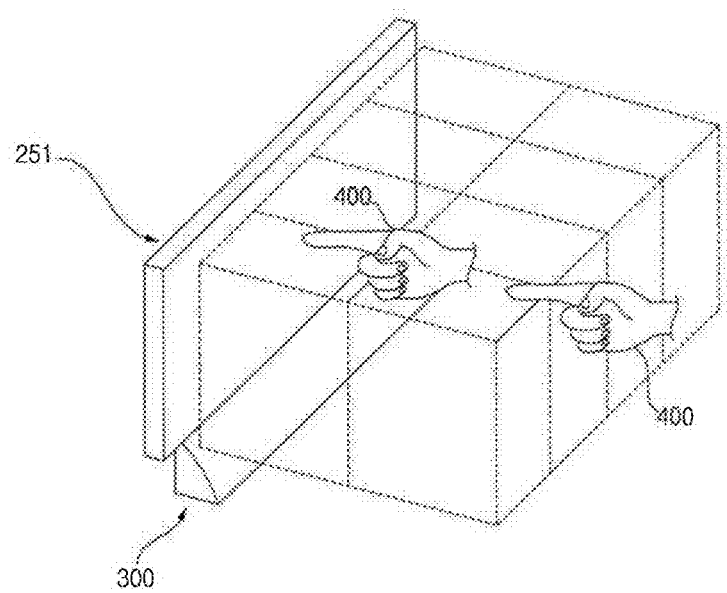
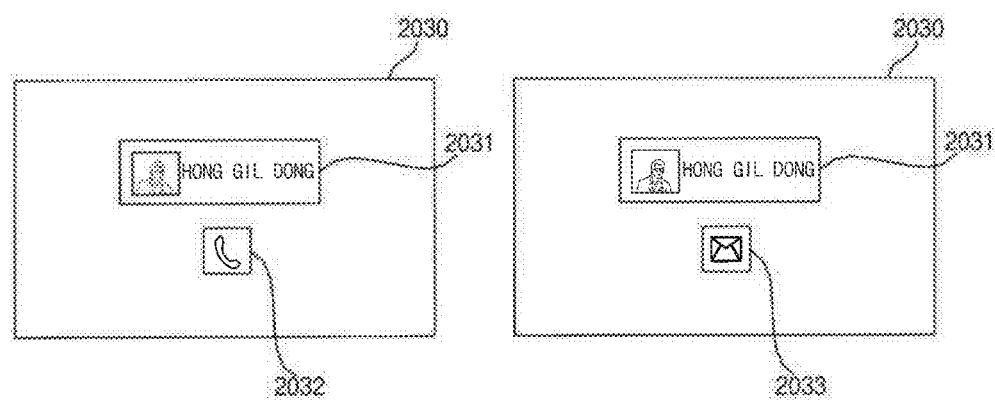

FIG. 21
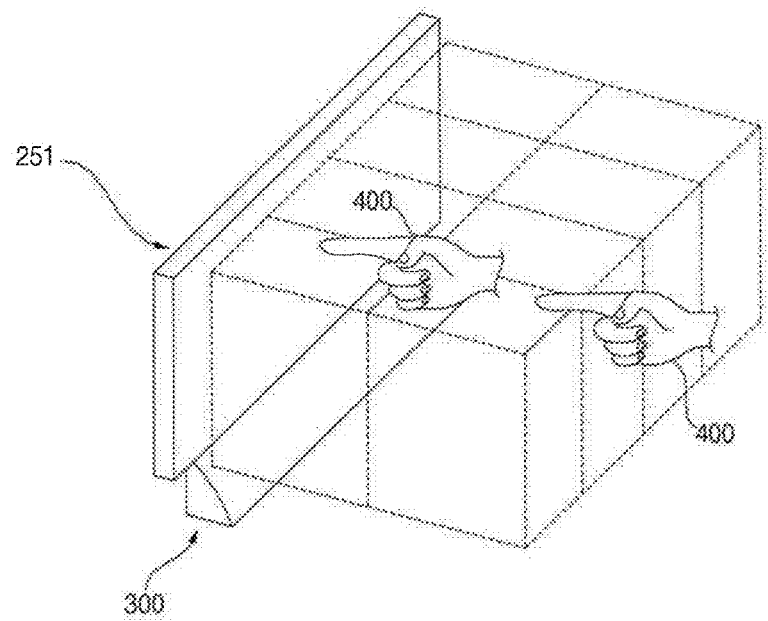
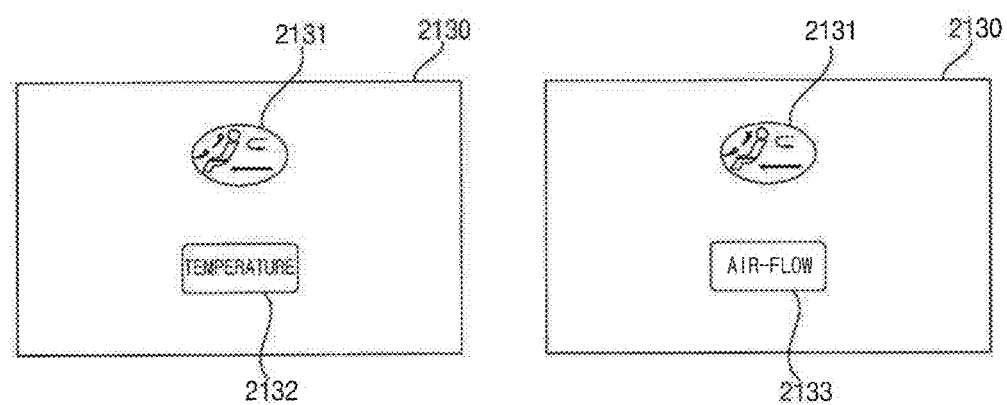

FIG. 22
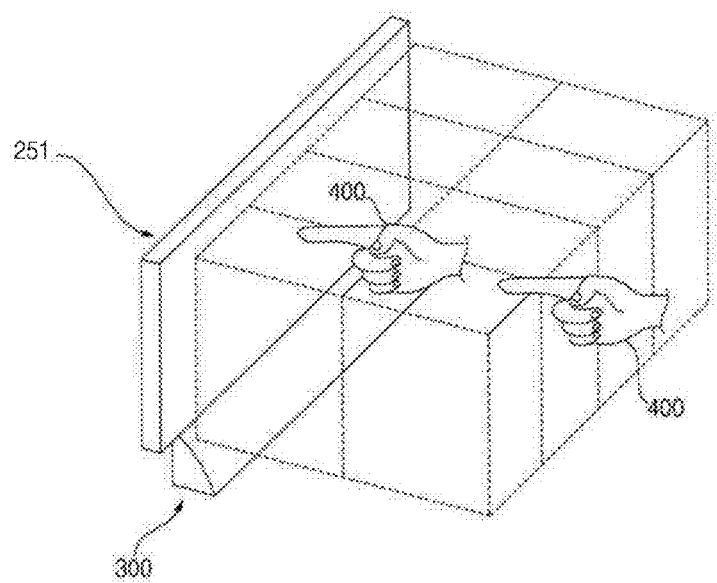
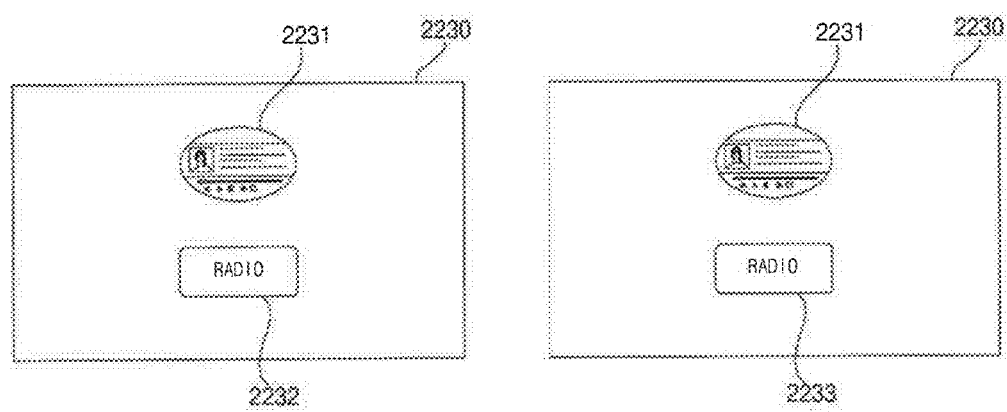

FIG. 23
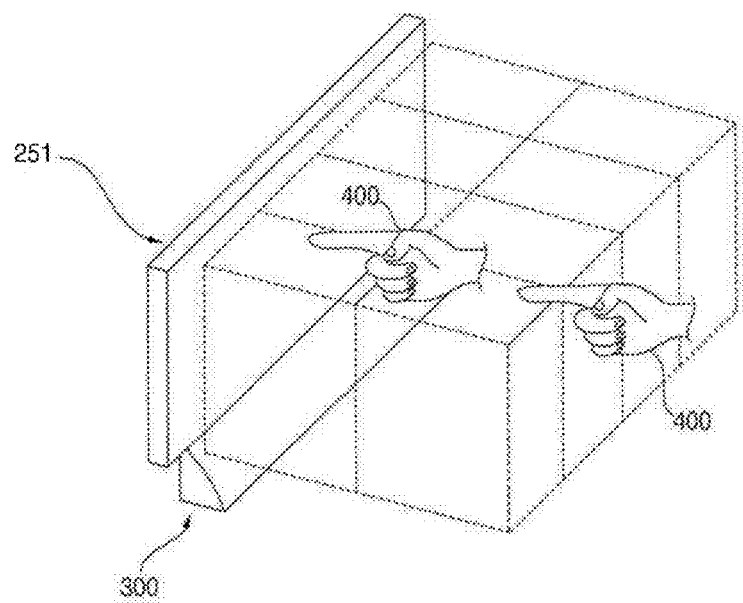
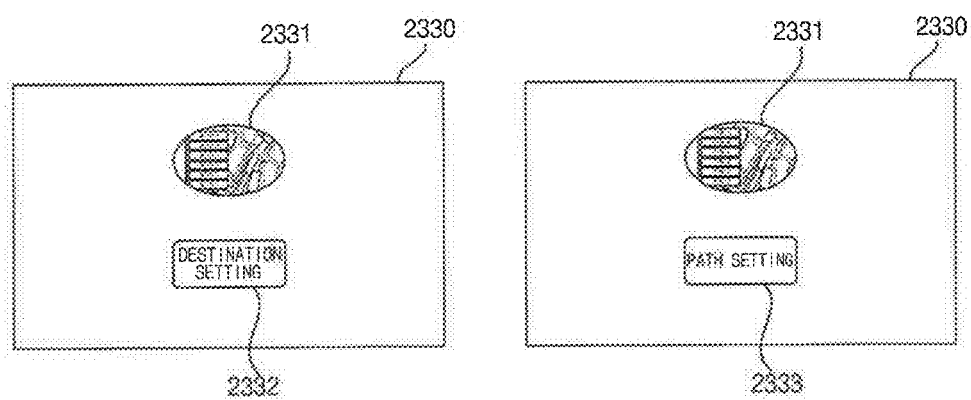

DISPLAY APPARATUS FOR VEHICLE

CROSS-REFERENCE TO RELATED APPLICATION

This application claims the priority benefit of Korean Patent Application No. 10-2016-0050299, filed on Apr. 25, 2016 in the Korean Intellectual Property Office, the disclosure of which is incorporated herein by reference.

BACKGROUND

The present invention relates to a display apparatus for a vehicle and a vehicle having the display apparatus.

A vehicle is an apparatus that moves in a direction desired by a user riding therein. A representative example of a vehicle may be an automobile.

Meanwhile, for the convenience of a user who uses the vehicle, for example, a variety of sensors and electronic devices have been mounted in vehicles. In particular, for user driving convenience, an Advanced Driver Assistance System (ADAS) has actively been studied. In addition, autonomous vehicles have actively been developed.

For a user riding in the vehicle, various studies on display apparatuses for providing various pieces of information are underway.

With the recent developments of touch technology, 3D technology and the like, technology for enabling 3D interaction have actively been studied.

Here, 3D interaction is technology that includes sensing of a Z-axis input, in addition to the sensing of X-axis and Y-axis input as performed by a conventional touch sensor. Currently, efforts to realize a proximity-touch or spatial recognition based on, for example, cameras and ultrasonic waves and to commercialize the same in vehicles are being made.

SUMMARY

It is one object of the present invention to provide a display apparatus for a vehicle, which may improve the convenience of a user.

It is another object of the present invention to provide a display apparatus for a vehicle, which provides a high rate of recognition of 3D gestures.

Objects of the present invention should not be limited to the aforementioned objects and other not-mentioned objects will be clearly understood by those skilled in the art from the following description.

In accordance with an embodiment of the present invention, the above and other objects can be accomplished by the provision of a display apparatus for a vehicle, including a display unit, a gesture sensing unit located around the display unit for sensing a 3D gesture made by an object, and a processor for generating a control signal based on the 3D gesture, wherein the gesture sensing unit includes a first light-emitting unit for emitting a first group of rays along a first optical path, a second light-emitting unit for emitting a second group of rays along a second optical path, and a light-receiving unit for receiving a first group of reflected rays formed when the first group of rays is reflected by the object and a second group of reflected rays formed when the second group of rays is reflected by the object.

Detailed items of other embodiments are included in the following description and the accompanying drawings.

BRIEF DESCRIPTION OF THE DRAWINGS

The embodiments will be described in detail with reference to the following drawings in which like reference numerals refer to like elements wherein:

FIGS. 18 and 19 are views referenced to describe the distribution of energy of emitted rays when a beam shaper is included in accordance with an embodiment of the present invention;

FIGS. 20 to 23 are views referenced to describe the operation of the display apparatus for the vehicle when a gesture is received in accordance with an embodiment of the present invention.

DETAILED DESCRIPTION

Figure 1:
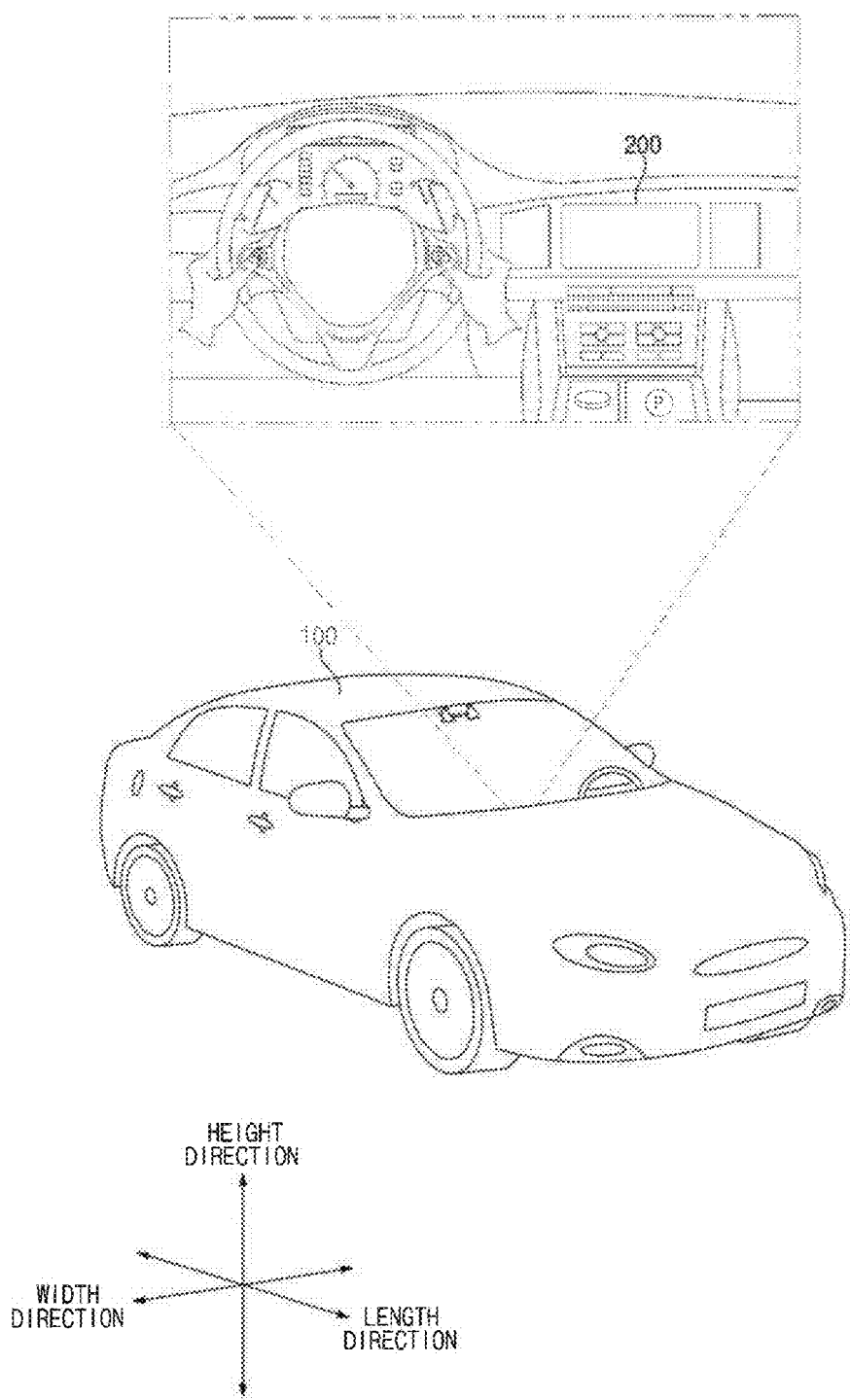
FIG. 1 is a view illustrating the external appearance of a vehicle in accordance with an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given or mingled with each other only in consideration of ease in the preparation of the specification, and do not have or serve as different meanings. Accordingly, the suffixes "module" and "unit" may be mingled with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions included in the scope and sprit of the present invention.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on a car.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a view illustrating the external appearance of a vehicle in accordance with an embodiment of the present invention.

FIG. 1 is a view illustrating the external appearance of a vehicle in accordance with an embodiment of the present invention.

Referring to FIG. 1, the vehicle, designated by reference numeral 100, may include wheels, which are rotated by a power source, and a steering input device for controlling the direction of travel of the vehicle 100.

In some embodiments, the vehicle 100 may be an autonomous vehicle. The autonomous vehicle enables bidirectional switching between an autonomous driving mode and a manual mode in response to user input. When switched to the manual mode, the autonomous vehicle 100 may receive driver input for driving via a driving operation device 121 (see FIG. 2).

The vehicle 100 may include, for example, an engine for supplying power from fossil fuels, or an electric motor for supplying power using a Direct Current (DC) power source, such as a solar cell or a battery. In addition, the vehicle 100 may include, for example, a gearbox for converting the power of the engine to torque, and a brake for stopping the movement of the vehicle.

The vehicle 100 may include a driver assistance apparatus. The driver assistance apparatus is an apparatus that assists a driver based on information formed from various sensors. The driver assistance apparatus may be referred to as an Advanced Driver Assistance System (ADAS).

The vehicle 100 may include a vehicle display apparatus 200, which functions as an output apparatus and an input apparatus, in a passenger compartment.

The vehicle display apparatus 200 in accordance with an embodiment of the present invention is a display apparatus that has a 3D interaction function, and enables proximity touch or spatial recognition.

Meanwhile, in the following description, the "X-axis" may be the horizontal axis of the vehicle display apparatus 200. For example, the "X-axis" may be the axis in the overall width direction of the vehicle 100.

In addition, the "Y-axis" may be the vertical axis of the vehicle display apparatus 200. For example, the "Y-axis" may be the axis in the overall height direction of the vehicle 100.

In addition, the "Z-axis" may be the axis orthogonal to X-axis and Y-axis. For example, the "Z-axis" may be the axis in the overall length direction of the vehicle 100. The Z-axis may be the axis in the direction of distance between a display unit 251 (FIG. 2) and an object 400 (e.g. the user's hand) (FIG. 3).

"The overall length" means the length from the front end to the rear end of the vehicle 100, "the overall width" means the width of the vehicle 100, and "the overall height" means the height from the bottom of the wheel to the roof. In the following description, "the overall length direction L" may mean the reference direction for the measurement of the overall length of the vehicle 100, "the overall width direction W" may mean the reference direction for the measurement of the overall width of the vehicle 100, and "the overall height direction H" may mean the reference direction for the measurement of the overall height of the vehicle 100.

Figure 2:
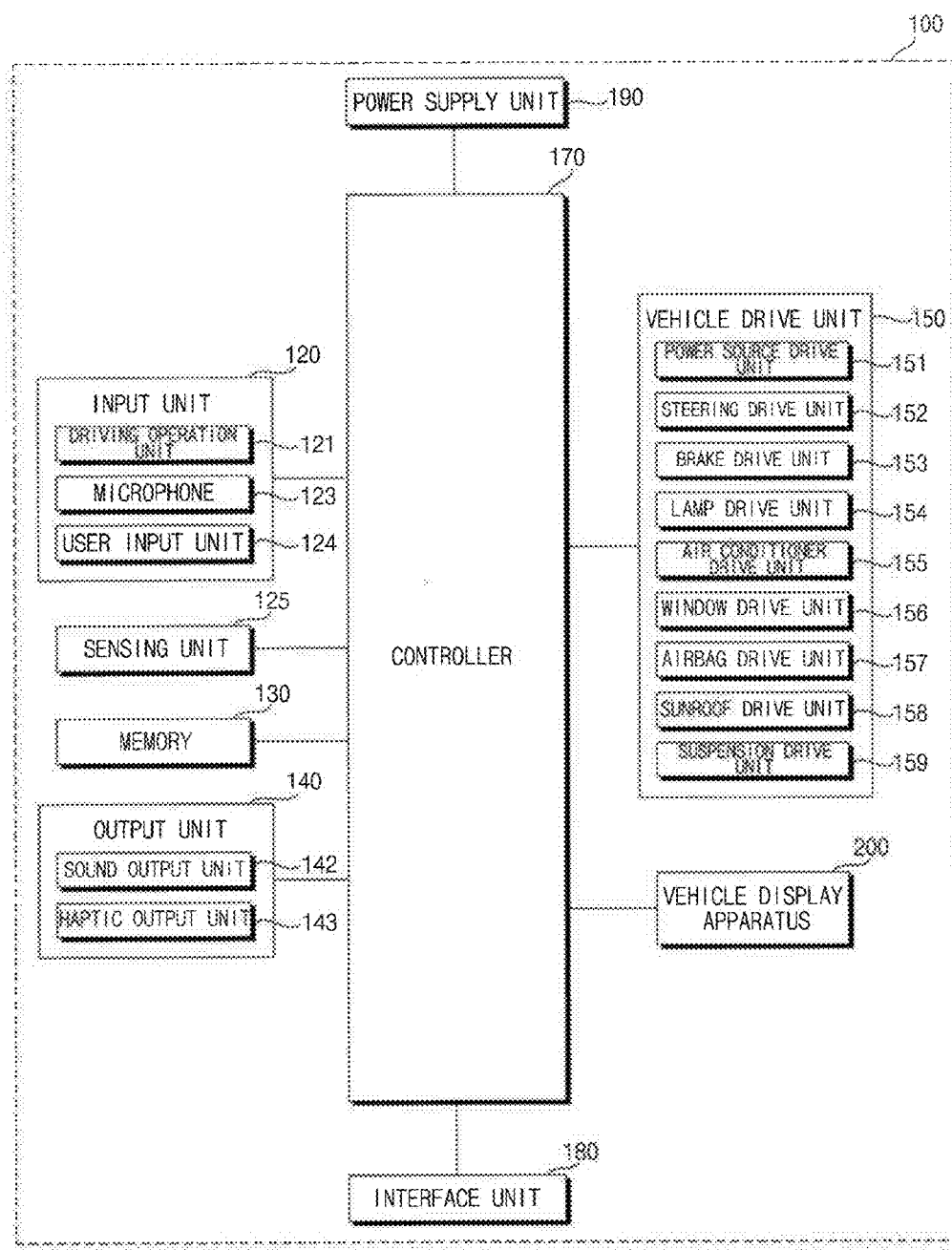
FIG. 2 is a block diagram referenced to describe a vehicle in accordance with an embodiment of the present invention.
Figure 3:
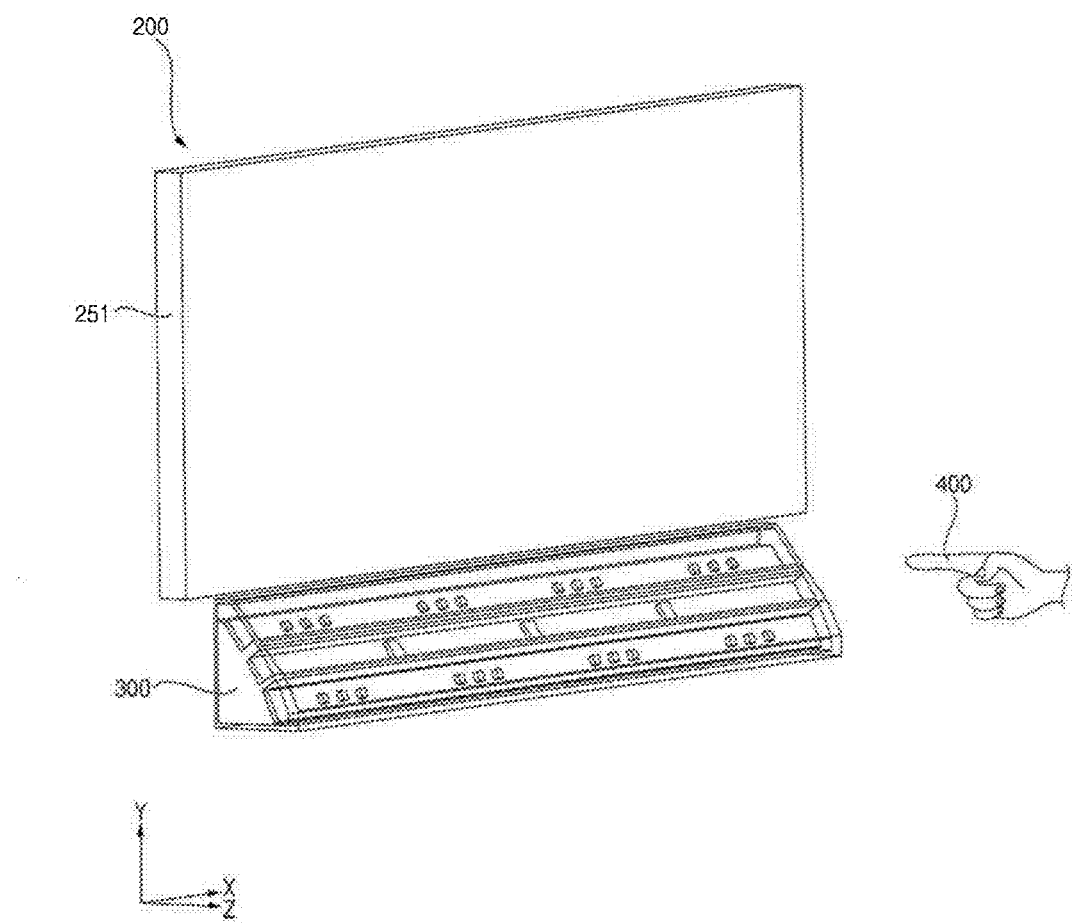
FIG. 3 is a perspective view of a display apparatus for a vehicle in accordance with an embodiment of the present invention.

FIG. 2 is a block diagram referenced to describe the vehicle in accordance with an embodiment of the present invention.

Referring to FIG. 2, the vehicle 100 may include an input unit 120, a sensing unit 125, a memory 130, an output unit 140, a vehicle drive unit 150, a controller 170, an interface unit 180, a power supply unit 190, and a driver assistance apparatus.

The input unit 120 may include a driving operation device 121, a microphone 123, and a user input unit 124.

The driving operation device 121 receives user input for the driving of the vehicle 100. The driving operation device 121 may include a steering input device, a shift input device, an acceleration input device, and a brake input device.

The steering input device receives user input with regard to the direction of travel of the vehicle 100. The steering input device may take the form of a wheel to enable steering input via rotation thereof. In some embodiments, the steering input device may be configured as a touchscreen, a touch pad, or a button.

The shift input device receives input for selecting one of Park (P), Drive (D), Neutral (N), and Reverse (R) gears of the vehicle 100 from the user. The shift input device may take the form of a lever. In some embodiments, the shift input device may be configured as a touchscreen, a touch pad, or a button.

The acceleration input device receives user input for the acceleration of the vehicle 100. The brake input device receives user input for the speed reduction of the vehicle 100. Each of the acceleration input device and the brake input device may take the form of a pedal. In some embodiments, the acceleration input device or the brake input device may be configured as a touchscreen, a touch pad, or a button.

The microphone 123 may process external sound signals into electrical data. The processed data may be utilized in various ways according to a function that the vehicle 100 is performing. The microphone 123 may convert a user voice command into electrical data. The converted electrical data may be transmitted to the controller 170.

Meanwhile, in some embodiments, a camera 122 or the microphone 123 may be components included in the sensing unit 125, rather than components included in the input unit 120.

The user input unit 124 receives information from the user. When information is input via the user input unit 124, the controller 170 may control the operation of the vehicle 100 so as to correspond to the input information. The user input unit 124 may include a touch input unit or a mechanical input unit. In some embodiments, the user input unit 124 may be located in a region of the steering wheel. In this case, the driver may operate the user input unit 124 with the fingers while gripping the steering wheel.

The sensing unit 125 senses various situations in the vehicle 100 or situations outside the vehicle 100. To this end, the sensing unit 125 may include a collision sensor, steering-wheel sensor, speed sensor, gradient sensor, weight sensor, heading sensor, yaw sensor, gyro sensor, position module, vehicle forward/reverse sensor, battery sensor, fuel sensor, tire sensor, steering sensor based on the rotation of the steering wheel, vehicle interior-temperature sensor, vehicle interior-humidity sensor, ultrasonic sensor, illumination sensor, accelerator pedal position sensor, brake pedal position sensor, etc.

The sensing unit 125 may acquire sensing signals with regard to, for example, vehicle collision information, vehicle driving direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior-temperature information, vehicle interior-humidity information, steering-wheel rotation angle information, vehicle external illumination, pressure applied to an accelerator pedal, and pressure applied to a brake pedal.

The sensing unit 125 may further include, for example, an accelerator pedal sensor, pressure sensor, engine speed sensor, Air Flow-rate Sensor (AFS), Air Temperature Sensor (ATS), Water Temperature Sensor (WTS), Throttle Position Sensor (TPS), Top Dead Center (TDC) sensor, and Crank Angle Sensor (CAS).

Meanwhile, a location information module may be arranged as a sub-component of the sensing unit 125.

The sensing unit 125 may include an object sensing unit capable of sensing an object 400 around the vehicle. Here, the object sensing unit may include a camera module, radar, Lidar, or ultrasonic sensor. In this case, the sensing unit 125 may sense a front object 400 located at the front of the vehicle, or a rear object 400 located at the rear of the vehicle using the camera module, radar, Lidar, or ultrasonic sensor.

Meanwhile, in some embodiments, the object sensing unit may be sorted as a constituent component of the driver assistance apparatus.

The memory 130 is electrically connected to the controller 170. The memory 130 may store basic data for each unit, control data for the operation control of the unit, and input/output data. The memory 130 may be any of various storage devices, such as a ROM, RAM, EPROM, flash drive, and hard drive. The memory 130 may store various data for the overall operation of the vehicle 100, such as programs for the processing or control of the controller 170.

The output unit 140 outputs information processed in the controller 170. The output unit 140 may include a sound output unit 142 and a haptic output unit 143.

The sound output unit 142 converts electrical signals from the controller 170 into audio signals and to output the audio signals. To this end, the sound output unit 142 may include, for example, a speaker. The sound output unit 142 may output sound corresponding to the operation of the user input unit 124.

The haptic output unit 143 generates tactile output. For example, the haptic output unit 143 may operate to vibrate a steering wheel, a safety belt, or a seat so as to allow the user to recognize an output thereof.

The vehicle drive unit 150 may control the operation of various devices of the vehicle. The vehicle drive unit 150 may include a power source drive unit 151, a steering drive unit 152, a brake drive unit 153, a lamp drive unit 154, an air conditioner drive unit 155, a window drive unit 156, an airbag drive unit 157, a sunroof drive unit 158, and a suspension drive unit 159.

The power source drive unit 151 may perform electronic control for a power source inside the vehicle 100.

For example, when a fossil fuel based engine (not illustrated) is a power source, the power source drive unit 151 may perform electronic control for the engine. As such, the power source drive unit 151 may control, for example, an output torque of the engine. When the power source drive unit 151 is the engine, the power source drive unit 151 may limit the speed of the vehicle by controlling the output torque of the engine under the control of the controller 170.

In another example, when an electric motor (not illustrated) is a power source, the power source drive unit 151 may perform control for the motor. As such, the power source drive unit 151 may control, for example, the RPM and torque of the motor.

The steering drive unit 152 may perform electronic control for a steering apparatus inside the vehicle 100. As such, the steering drive unit 152 may change the direction of travel of the vehicle 100.

The brake drive unit 153 may perform electronic control for a brake apparatus (not illustrated) inside the vehicle 100. For example, the brake drive unit 153 may reduce the speed of the vehicle 100 by controlling the operation of brakes located at wheels. In another example, the brake drive unit 153 may adjust the direction of travel of the vehicle 100 leftward or rightward by differentiating the operation of respective brakes located at left and right wheels.

The lamp drive unit 154 may turn at least one lamp arranged inside and outside the vehicle on or off. In addition, the lamp drive unit 154 may control, for example, the intensity and direction of light of the lamp. For example, the lamp drive unit 154 may perform control for a turn-signal lamp, a headlamp or a brake lamp.

The air conditioner drive unit 155 may perform electronic control for an air conditioner (not illustrated) inside the vehicle 100. For example, when the interior temperature of the vehicle is high, the air conditioner drive unit 155 may operate the air conditioner so as to supply cold air to the interior of the vehicle.

The window drive unit 156 may perform electronic control for a window apparatus inside the vehicle 100. For example, the window drive unit 156 may control the opening or closing of left and right windows of the vehicle.

The airbag drive unit 157 may perform electronic control for an airbag apparatus inside the vehicle 100. For example, the airbag drive unit 157 may control an airbag so as to be deployed in a dangerous situation.

The sunroof drive unit 158 may perform electronic control for a sunroof apparatus (not illustrated) inside the vehicle 100. For example, the sunroof drive unit 158 may control the opening or closing of a sunroof.

The suspension drive unit 159 may perform electronic control for a suspension apparatus (not illustrated) inside the vehicle 100. For example, when the road surface is uneven, the suspension drive unit 159 may control the suspension apparatus in order to reduce vibration of the vehicle 100.

Meanwhile, in some embodiments, the vehicle drive unit 150 may include a chassis drive unit. Here, the chassis drive unit may include the steering drive unit 152, the brake drive unit 153, and the suspension drive unit 159.

The controller 170 may control the overall operation of each unit inside the vehicle 100. The controller 170 may be referred to as an Electronic Control Unit (ECU).

The controller 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The interface unit 180 may serve as a passage for various kinds of external devices that are connected to the vehicle 100. For example, the interface unit 180 may have a port that is connectable to a mobile terminal and may be connected to the mobile terminal via the port. In this case, the interface unit 180 may exchange data with the mobile terminal.

Meanwhile, the interface unit 180 may serve as a passage for supplying electricity to a mobile terminal connected thereto. When the mobile terminal is electrically connected to the interface unit 180, the interface unit 180 may provide electricity supplied from the power supply unit 190 to the mobile terminal under the control of the controller 170.

The power supply unit 190 may supply power required to operate the respective components under the control of the controller 170. In particular, the power supply unit 190 may receive power from, for example, a battery (not illustrated) inside the vehicle 100.

FIG. 3 is a perspective view of a display apparatus for the vehicle in accordance with an embodiment of the present invention.

Figure 4:
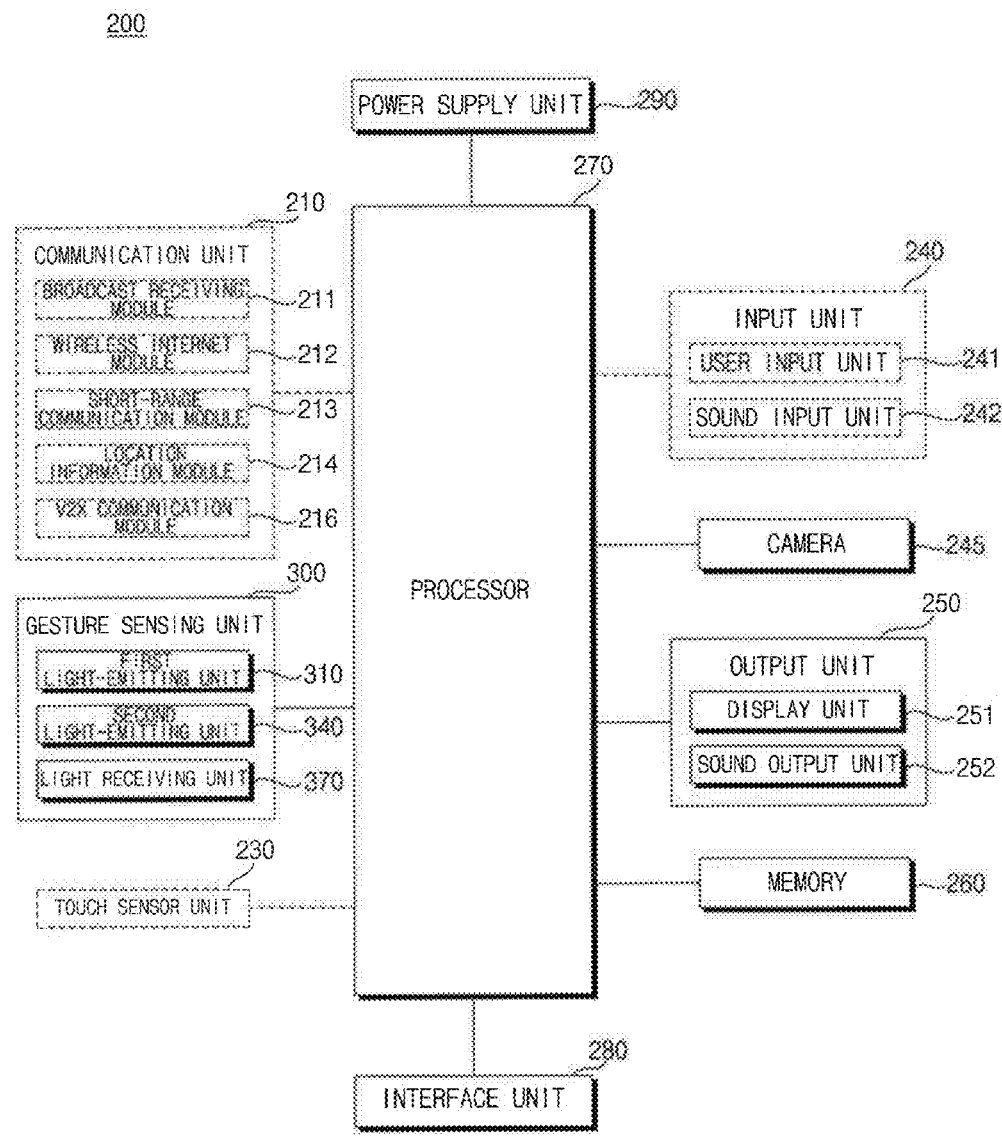
FIG. 4 is a block diagram of a display apparatus for a vehicle in accordance with an embodiment of the present invention.

FIG. 4 is a block diagram of the display apparatus for the vehicle in accordance with an embodiment of the present invention.

Referring to FIGS. 3 and 4, the vehicle display apparatus 200 may include a communication unit 210, a gesture sensing unit 300, a touch sensor unit 230, an input unit 240, a camera 245, an output unit 250, a memory 260, a processor 270, an interface unit 280, and a power supply unit 290.

The communication unit 210 may include one or more modules for enabling wireless communication between the vehicle display apparatus 200 and a mobile terminal, between the vehicle 100 and an external server, or between the vehicle 100 and another vehicle. In addition, the communication unit 210 may include one or more modules for connecting the vehicle display apparatus 200 to one or more networks.

The communication unit 210 may function as a communication device of the vehicle 100.

The communication unit 210 may transmit control signals, generated in the processor 270, to an external device. In particular, the communication unit 210 may transmit control signals, generated in the processor 270, to a mobile terminal via a short-range communication module 213. For example, the communication unit 210 may transmit a control signal for making a call to a mobile terminal.

The communication unit 210 may include a broadcast receiving module 211, a wireless Internet module 212, a short-range communication module 213, a location information module 214, and a V2X communication module 216.

The broadcast receiving module 211 receives a broadcast signal or broadcast-associated information from an external broadcast management server via a broadcast channel. Here, broadcast includes radio broadcast or TV broadcast.

The wireless Internet module 212 is a module for wireless Internet connection. This module may be internally or externally coupled to the vehicle 100. The wireless Internet module 212 is configured to transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 212 transmits or receives data according to one or more of such wireless Internet technologies, and other Internet technologies as well. For example, the wireless Internet module 212 may exchange data with an external server in a wireless manner. The wireless Internet module 212 may receive weather information and road traffic information (e.g. Transport Protocol Expert Group (TPEG) information) from an external server.

The short-range communication module 213 serves to perform short-range communication. The short-range communication module 213 may support short-range communication using at least one technology selected from among Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and Wireless Universal Serial Bus (Wireless USB).

The short-range communication module 213 may construct wireless area networks so as to perform short-range communication between the vehicle 100 and at least one external device. For example, the short-range communication module 213 may exchange data with a mobile terminal of a passenger in a wireless manner. The short-range communication module 213 may receive weather information and road traffic information (e.g. Transport Protocol Expert Group (TPEG) information) from an external server. When the user gets into the vehicle 100, a mobile terminal of the user and the vehicle 100 may pair with each other automatically or as the user executes a pairing application.

The location information module 214 is a module for acquiring a location of the vehicle 100. A representative example of the location information module 214 includes a Global Positioning System (GPS) module. For example, when the vehicle 100 utilizes a GPS module, the location information module 214 may acquire information regarding a location of the vehicle 100 using signals transmitted from GPS satellites.

The V2X communication module 216 is a module for performing wireless communication with a server or another vehicle. The V2X communication module 216 includes a module capable of realizing a protocol for communication between vehicles (V2V) or communication between a vehicle and an infrastructure (V2I). The vehicle 100 may perform wireless communication with an external server or another vehicle via the V2X communication module 216.

The gesture sensing unit 300 may sense a 3D gesture made by an object in front of the display unit 251.

The gesture sensing unit 300 may be arranged around the display unit 251 and may sense a 3D gesture made by the object 400.

The gesture sensing unit 300 is located at a first side of the display unit 251

For example, the gesture sensing unit 300 may be arranged at the lower end of the display unit 251.

The object 400 may be the user's hand or finger.

The gesture sensing unit 300 may include a first light-emitting unit 310, a second light-emitting unit 340, and a light-receiving unit 370.

In some embodiments, the first light-emitting unit 310, the second light-emitting unit 340, and the light-receiving unit 370 may be formed on a single Printed Circuit Board (PCB).

In some embodiments, the first light-emitting unit 310, the second light-emitting unit 340, and the light-receiving unit 370 may be formed on different respective PCBs.

The first light-emitting unit 310 may emit a first group of rays.

The first group of rays may include a plurality of rays. The respective rays may have different optical paths.

The first light-emitting unit 310 may include an infrared light source and a wedge lens.

The infrared light source may be provided in a plural number. The present disclosure is not limited as to the number of infrared light sources.

The light sources included in the first light-emitting unit 310 may be referred to as a first light source group. The first light source group may generate a first group of rays.

The light sources included in the first light-emitting unit 310 may include a first light source and a second light source. The first light source may generate a first ray, and the second light source may generate a second ray.

The first light source and the second light source, included in the first light-emitting unit 310, may emit a first ray and a second ray respectively during different time periods under the control of the processor 270.

The wedge lens may be provided in a plural number. The present disclosure is not limited as to the number of wedge lenses. For example, the wedge lenses may be provided so as to correspond in number to the number of infrared light sources.

The wedge lens may receive the first group of rays from the plurality of infrared light sources.

The wedge lens may change respective paths of the first group of rays.

The wedge lenses may change the paths of rays generated in the respective infrared light sources.

The wedge lenses may include a first wedge lens and a second wedge lens.

The first wedge lens may change the first ray, generated in the first light source, to a first-a optical path.

The first light source may generate a first ray in the first group of rays.

The first wedge lens may change a path of the first ray.

The second wedge lens may change the second ray, generated in the second light source, to a first-b optical path.

The second light source may generate a second ray in the first group of rays.

The second wedge lens may change a path of the second ray.

The first light-emitting unit 310 may include a first group of infrared light sources, a first PCB 319 (FIG. 6), a beam shaper, and a light guide individually or in combinations thereof.

Figure 6:
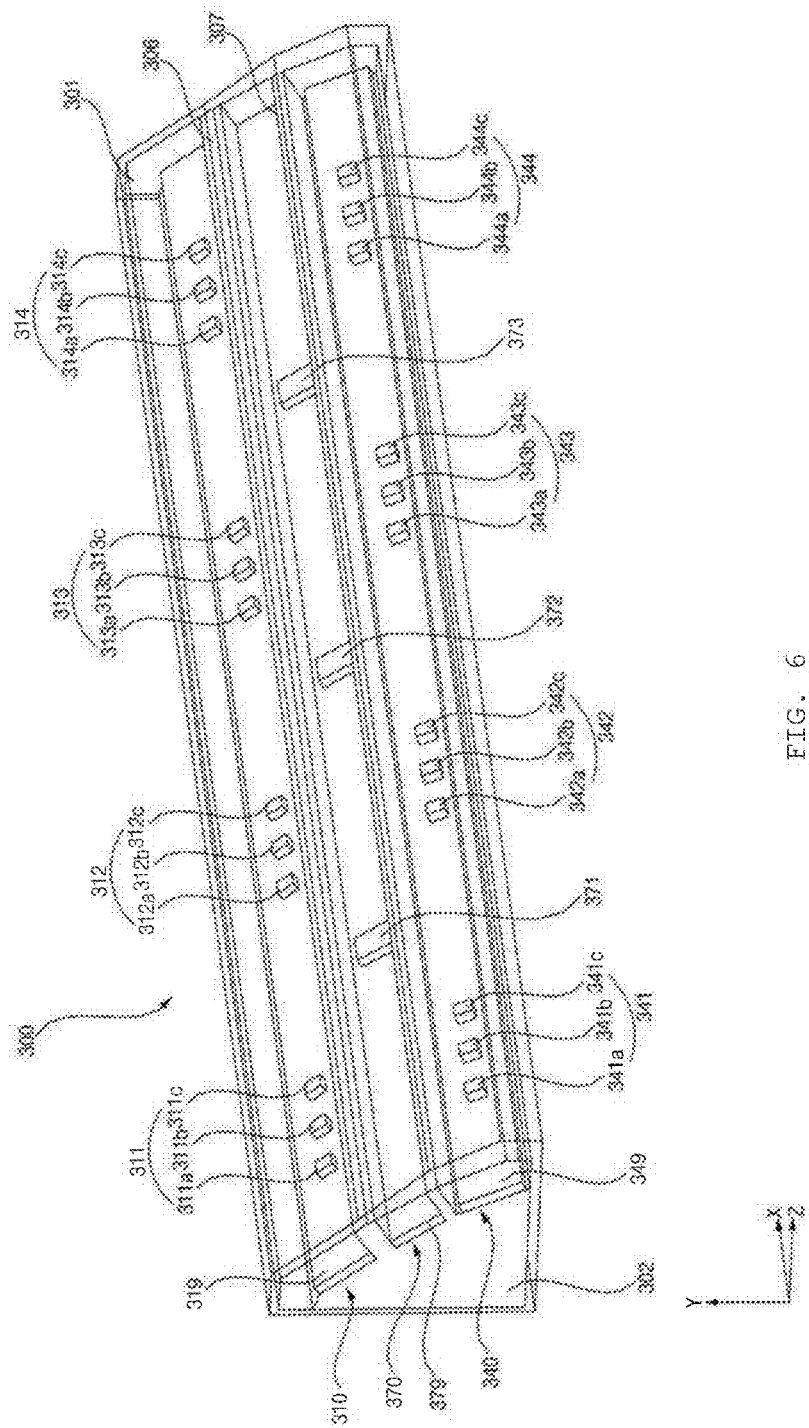
FIG. 6 is a view illustrating the external appearance of the gesture sensing unit in accordance with an embodiment of the present invention.

The first light source group may be mounted on the first PCB 319 (FIG. 6).

The first group of infrared light sources are mounted on the first PCB 319.

The first group of infrared light sources generate the first group of rays.

The beam shaper may be provided in a plural number. The present disclosure is not limited as to the number of beam shapers. For example, the beam shapers may be provided so as to correspond in number to the number of infrared light sources.

The beam shapers may change rays, having paths changed by the wedge lenses, into rays having an even energy distribution.

The beam shapers may receive the first group of rays from the wedge lens.

The beam shapers may change energy distribution of each ray of the first group of rays.

The light guide may guide the rays, having passed through the beam shapers, to the outside.

The light guide may receive the first group of rays from the beam shaper.

The light guide may guide the first group of rays toward the object.

The second light-emitting unit 340 may emit a second group of rays.

The second group of rays may include a plurality of rays. The respective rays may have different optical paths.

The second light-emitting unit 340 may include an infrared light source and a wedge lens.

The infrared light source may be provided in a plural number. The present disclosure is not limited as to the number of infrared light sources.

The light sources included in the second light-emitting unit 340 may be referred to as a second light source group. The second light source group may generate a second group of rays.

The light sources included in the second light-emitting unit 340 may include a first light source and a second light source. The first light source generates a first ray, and the second light source generates a second ray.

The first light source and the second light source, included in the second light-emitting unit 340, may emit a first ray and a second ray respectively during different time periods under the control of the processor 270.

The wedge lens may be provided in a plural number. The present disclosure is not limited as to the number of wedge lenses. For example, the wedge lenses may be provided so as to correspond in number to the number of infrared light sources.

The wedge lens may receive the first group of rays from the plurality of infrared light sources.

The wedge lens may change respective paths of the first group of rays.

The wedge lenses may change the paths of rays generated in the respective infrared light sources.

The wedge lenses may include a first wedge lens and a second wedge lens.

The first wedge lens may change the first ray, generated in the first light source, to a second-a optical path.

The first light source may generate a first ray in the first group of rays.

The first wedge lens may change a path of the first ray.

The second wedge lens may change the second ray, generated in the second light source, to a second-b optical path.

The second light source may generate a second ray in the first group of rays.

The second wedge lens may change a path of the second ray.

The second light-emitting unit 340 may include a second group of infrared light sources, a second PCB 349 (FIG. 6), a beam shaper, and a light guide individually or in combinations thereof.

The second light source group may be mounted on the second PCB 349 (FIG. 6).

The second group of infrared light sources are mounted on the second PCB 349.

The second group of infrared light sources generate the second group of rays.

The beam shaper may be provided in a plural number. The present disclosure is not limited as to the number of beam shapers. For example, the beam shapers may be provided so as to correspond in number to the number of infrared light sources.

The beam shapers may change rays, having paths changed by the wedge lenses, into rays having an even energy distribution.

The light guide may guide the rays having passed through the beam shapers to the outside.

The first light-emitting unit 310 and the second light-emitting unit 340 may emit the first group of rays and the second group of rays respectively during different time periods under the control of the processor 270.

The first light-emitting unit 310 may emit the first group of rays during a first time period and the second light-emitting unit 340 may emit the second group of rays during a second time period under the control of the processor 270.

The light-receiving unit 370 may receive (i) reflected rays of the first group of rays that are reflected from the object (ii) reflected rays of the second group of rays that are reflected from the object.

The light-receiving unit 370 may receive reflected rays. The light-receiving unit 370 may receive a first group of reflected rays, which are formed when the first group of rays is reflected by the object 400. The light-receiving unit 370 may receive a second group of reflected rays, which are formed when the second group of rays is reflected by the object 400.

The light-receiving unit 370 may include a photodiode and a lens (for example, a wide-angle lens).

The photodiode may be provided in a plural number.

A plurality of photodiodes may accept, from the lens (for example, the wide-angle lens), the reflected rays of the first group of rays and the reflected rays of the second group of rays.

A plurality of photodiodes may generate, based on the reflected rays of the first group of rays and the reflected rays of the second group of rays, current signals.

The present disclosure is not limited as to the number of photodiodes.

A lens may receive the reflected rays of the first group of rays and the reflected rays of the second group of rays.

A lens may change respective paths of the reflected rays of the first group of rays and the reflected rays of the second group of rays.

The wide-angle lens may change the path of a reflected ray. For example, the wide-angle lens may change the paths of the first group of reflected rays and the paths of the second group of reflected rays.

The light-receiving unit 370 may include a plurality of photodiodes, a third PCB 379 (FIG. 6) and a light guide individually or in combinations thereof.

The photodiodes may be mounted on the third PCB 379 (FIG. 6).

The plurality of photodiodes may be mounted on the third PCB 379.

The plurality of photodiodes may accept the reflected rays of the first group of rays and the reflected rays of the second group of rays.

The light guide may guide a reflected ray to the wide-angle lens. For example, the light guide may guide the first group of reflected rays and the second group of reflected rays to the wide-angle lens.

The light guide may guide toward the lens, the reflected rays of the first group of rays and the reflected rays of the second group of rays.

The light-receiving unit 370 may be located between the first light-emitting unit 310 and the second light-emitting unit 340.

By being located between the first light-emitting unit 310 and the second light-emitting unit 340, the light-receiving unit 370 may increase the rate of reception of the first group of reflected rays and the second group of reflected rays.

The gesture sensing unit 300 may further include a first barrier 306 (FIG. 6) and a second barrier 307 (FIG. 6).

The first barrier 306 (FIG. 6) may be formed between the first infrared light source group and the photodiodes.

The first barrier 306 (FIG. 6) may be located between the first group of infrared light sources and the photodiodes.

The first barrier 306 (FIG. 6) may be formed between the first PCB 319 (FIG. 6) and the third PCB 379 (FIG. 6).

The first barrier 306 (FIG. 6) may secure the emission paths of the first group of rays. The first barrier 306 (FIG. 6) may secure the reception paths of the first group of reflected rays and the second group of reflected rays. The first barrier 306 (FIG. 6) may prevent noise from the reflected rays from mixing with the rays emitted from the first light source group. The first barrier 306 (FIG. 6) may prevent noise from the emitted rays from mixing with rays received by the photodiodes.

The second barrier 307 (FIG. 6) may be formed between the second infrared light source group and the photodiodes.

The second barrier 307 (FIG. 6) may be located between the photodiodes and the second group of infrared light sources.

The second barrier 307 (FIG. 6) may be formed between the third PCB 379 (FIG. 6) and the second PCB 349 (FIG. 6).

The second barrier 307 (FIG. 6) may secure the emission paths of the second group of rays. The second barrier 307 (FIG. 6) may secure the reception paths of the first group of reflected rays and the second group of reflected rays. The second barrier 307 (FIG. 6) may prevent noise from the reflected rays from mixing with the rays emitted from the second light source group. The second barrier 307 (FIG. 6) may prevent noise from the emitted rays from mixing with rays received by the photodiodes.

The touch sensor unit 230 senses a floating touch and a direct touch. To this end, the touch sensor unit 230 may include, for example, an electrode array and an MCU. When the touch sensor unit 230 is operated, electrical signals are supplied to the electrode array so as to form an electric field over the electrode array.

The input unit 240 may include a user input unit 241 and a sound input unit 242.

The user input unit 241 serves to receive information from the user. When information is input via the user input unit 241, the processor 270 may control the operation of the vehicle display apparatus 200 so as to correspond to the input information. The user input unit 241 may include a touch input unit or a mechanical input unit.

The sound input unit 242 may process external sound signals into electrical data. The processed data may be utilized in various ways according to a function that the vehicle display apparatus 200 is performing. The sound input unit 242 may convert a user voice command into electrical data. The converted electrical data may be transmitted to the processor 270.

The camera 245 may include a lens, an image sensor, and an image processor.

The camera 245 may be located in a passenger compartment of the vehicle 100. For example, the camera 245 may be located on an instrument panel, a dashboard, a ceiling, or a center fascia of the vehicle 100.

The camera 245 may capture an interior image of the vehicle.

The camera 245 may detect the object 400 in the captured interior image of the vehicle. Here, the object 400 may be a passenger, or the passenger's hand.

For example, the camera 245 may detect a driver, the driver's hand, or the driver's finger. Alternatively, the camera 245 may detect a passenger sitting on a passenger seat, the passenger's hand, or the passenger's finger.

In some embodiments, the camera 245 may provide the interior image of the vehicle to the processor 270, and the processor 270 may detect the object 400 based on the interior image of the vehicle.

The output unit 250 serves to output information processed in the processor 270. The output unit 250 may include the display unit 251 and a sound output unit 252.

The display unit 251 may display information processed in the processor 270.

The display unit 251 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 251 may configure an inter-layer structure with a touch sensor, or may be integrally formed with the touch sensor to implement a touchscreen. The touchscreen may function as the user input unit 241, which provides an input interface between the vehicle display apparatus 200 and the user, and also function to provide an output interface between the vehicle display apparatus 200 and the user. In this case, the display unit 251 may include a touch sensor for sensing a touch to the display unit 251 so as to receive a control command in a touch manner. When a touch is input to the display unit 251 as described above, the touch sensor may sense the touch and the processor 270 may generate a control command corresponding to the touch. Content input in a touch manner may be characters or numbers, or may be, for example, instructions in various modes or menu items that may be designated.

Meanwhile, the display unit 251 may be implemented so as to display a screen in a region of a windshield.

The display unit 251 may include a transparent display. In this case, the transparent display may be attached to the windshield. In this case, the vehicle display apparatus 200 may output information via the transparent display.

The transparent display may display a prescribed screen with a prescribed transparency. In order to achieve the transparency, the transparent display may include at least one selected from among a transparent Thin Film Electroluminescent (TFEL) display, a transparent Organic Light Emitting Diode (OLED) display, a transparent Liquid Crystal Display (LCD), a transmissive transparent display, and a transparent LED display.

Meanwhile, the transparency of the transparent display may be adjusted under the control of the processor 270.

The display unit 251 may include a projector module. In this case, the vehicle display apparatus 200 may output information via an image projected to the windshield.

The projector module projects a beam toward the windshield. The projector module may include a light source and a projection lens. The projector module may form an image corresponding to information processed in the processor 270. That is, the projector module may form an image using light generated in the light source, and may project the formed image to the windshield. At this time, the light source may be, for example, an LED or laser.

The sound output unit 252 converts electrical signals from the processor 270 into audio signals and outputs the audio signals. To this end, the sound output unit 252 may include, for example, a speaker. The sound output unit 252 may output sound corresponding to the operation of the user input unit 241.

The memory 260 is electrically connected to the processor 270. The memory 260 may store basic data for each unit, control data for the operation control of the unit, and input/output data. The memory 260 may be any of various storage devices, such as a ROM, RAM, EPROM, flash drive, and hard drive.

The memory 260 may store various data for the overall operation of the vehicle display apparatus 200, such as programs for the processing or control of the processor 270.

The memory 260 may store data input via the communication unit 210, the gesture sensing unit 300, the input unit 240, and the interface unit 280.

In some embodiments, the memory 260 may be a subordinate component of the processor 270.

The memory 260 may store map data required to implement a navigation function. Here, the map data may be stored as a default at the release stage of the vehicle. Alternatively, the map data may be received from an external device via the communication unit 210 or the interface unit 280.

The processor 270 is electrically connected to each unit included in the vehicle display apparatus 200. The processor 270 may control the overall operation of each unit in the vehicle display apparatus 200.

The processor 270 may control the output unit 250 so as to output information or data received via the communication unit 210, the input unit 240, or the interface unit 280. The processor 270 may control the output unit 250 so as to output information or data stored in the memory 260. The processor 270 may directly output the received information or data, or may first process and then output the same. The processor 270 may output visual information or data via the display unit 251. The processor 270 may output audible information or data via the sound output unit 252.

Meanwhile, the processor 270 may generate new information based on information or data received via the interface unit 280. The processor 270 may control the display unit 251 so as to display a screen corresponding to the generated information or data.

The processor 270 may generate a control signal based on a sensed 3D gesture.

The processor 270 may control the display unit 251 based on the 3D gesture made by the object.

The processor 270 may control the output unit 250 in response to the generated control signal.

The processor 270 may provide the generated control signal to the controller 170 of the vehicle 100 or the vehicle drive unit 150 via the interface unit 280.

The processor 270 may control the first light-emitting unit 310. The processor 270 may control the first light-emitting unit 310 so as to output different rays during different time periods.

For example, the processor 270 may control the first light-emitting unit 310 so as to output a first ray from the first light source included therein for a first time period and to output a second ray from the second light source included therein for a second time period.

The processor 270 may control the second light-emitting unit 340. The processor 270 may control the second light-emitting unit 340 so as to output different rays during different time periods.

For example, the processor 270 may control the second light-emitting unit 340 so as to output a first ray from the first light source included therein for a first time period and to output a second ray from the second light source included therein for a second time period.

The processor 270 may control the first light-emitting unit 310 and the second light-emitting unit 340. The processor 270 may control the first light-emitting unit 310 and the second light-emitting unit 340 so as to output different groups of rays during different time periods.

For example, the processor 270 may control the first light-emitting unit 310 so as to output a first group of rays for a first time period and may control the second light-emitting unit 340 so as to output a second group of rays for a second time period.

The processor 270 may detect the position of the object 400 or the movement of the object 400 based on reflected rays received via the light-receiving unit 370.

For example, the processor 270 may detect, based on the reflected rays, the position of the object 400 or the movement of the object 400 along the X-axis, the Y-axis, or the Z-axis, or in the X-Y plane, the Y-Z plane, or the X-Z plane.

The processor 270 may detect, based on the reflected rays of the first group of rays or the reflected rays of the second group of rays, a 3D gesture of the object about a first axis within a distance between the display unit and the object.

The processor 270 may detect a gesture performed along the axis corresponding to the distance between the display unit 251 and the object 400 based on a first group of reflected rays or a second group of reflected rays. Here, the axis corresponding to the distance between the display unit 251 and the object 400 may be the Z-axis.

The processor 270 may detect, based on a determination that the reflected rays of the first group of rays are received, a 3D gesture of the object about a first axis within a distance between the display unit and the object.

The processor 270 may detect a gesture performed along the axis corresponding to the distance between the display unit 251 and the object 400 based on whether or not reflected rays, which correspond to the respective light sources of the first group included in the first light-emitting unit 310, are received. Here, the axis corresponding to the distance between the display unit 251 and the object 400 may be the Z-axis.

The processor 270 may detect, based on a determination that the reflected rays of the second group of rays are received, a 3D gesture of the object about a first axis within a distance between the display unit and the object.

The processor 270 may detect a gesture performed along the axis corresponding to the distance between the display unit 251 and the object 400 based on whether or not reflected rays, which correspond to the respective light sources of the second group included in the second light-emitting unit 340, are received. Here, the axis corresponding to the distance between the display unit 251 and the object 400 may be the Z-axis.

The processor 270 may receive information regarding the object 400 from the camera 245. Here, the information regarding the object 400 may be position information for the object 400 or movement information for the object 400.

The processor 270 may receive information regarding whether or not the detected hand is the driver's hand.

The processor 270 may generate a control signal based on the received object information.

For example, when the detected hand is the driver's hand, the processor 270 may generate a control signal based on a 3D gesture made by the hand.

In one example, when the detected hand is not the driver's hand, the processor 270 may not generate a control signal even when a 3D gesture made by the hand is sensed.

In some embodiments, the processor 270 may receive an interior image of the vehicle. The processor 270 may detect an object from the interior image of the vehicle.

The processor 270 may detect one or more objects in the interior image.

The processor 270 may generate a control signal based on the one or more objects in the image.

The processor 270 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The interface unit 280 may receive data, or may transmit signals processed or generated in the processor 270 to the outside. To this end, the interface unit 280 may perform data communication with, for example, the controller 170 or the sensing unit 125 inside the vehicle in a wired communication or wireless communication manner.

The interface unit 280 may receive sensor information from the controller 170 or the sensing unit 125.

Here, the sensor information may include at least one selected from among vehicle travel direction information, vehicle location information (GPS information), vehicle angle information, vehicle speed information, vehicle acceleration information, vehicle tilt information, vehicle forward/reverse movement information, battery information, fuel information, tire information, vehicle lamp information, vehicle interior-temperature information, and vehicle interior-humidity information.

The sensor information may be formed from, for example, a heading sensor, yaw sensor, gyro sensor, position module, vehicle forward/reverse movement sensor, wheel sensor, vehicle speed sensor, vehicle body gradient sensor, battery sensor, fuel sensor, tire sensor, steering sensor based on the rotation of a steering wheel, vehicle interior-temperature sensor, and vehicle interior-humidity sensor. Meanwhile, the position module may include a GPS module for receiving GPS information.

Meanwhile, among the sensor information, for example, vehicle travel direction information, vehicle location information, vehicle angle information, vehicle speed information, and vehicle tilt information, which are associated with the driving of the vehicle, may be referred to as vehicle driving information.

The interface unit 280 may transmit a control signal generated in the processor 270 to the outside.

The interface unit 280 may provide a control signal generated in the processor 270 to the vehicle drive unit 150.

In an example, the interface unit 280 may provide a signal for vehicle drive control to the power source drive unit 151.

In an example, the interface unit 280 may provide a signal for steering control to the steering drive unit 152.

In an example, the interface unit 280 may provide a signal for braking control to the brake drive unit 153.

In an example, the interface unit 280 may provide a signal for lamp control to the lamp drive unit 154.

In an example, the interface unit 280 may provide a signal for air-conditioning control to the air conditioner drive unit 155.

In an example, the interface unit 280 may provide a signal for window control to the window drive unit 156.

In an example, the interface unit 280 may provide a signal for airbag control to the airbag drive unit 157.

In an example, the interface unit 280 may provide a signal for sunroof control to the sunroof drive unit 158.

In an example, the interface unit 280 may provide a signal for suspension control to the suspension drive unit 159.

The power supply unit 290 may supply power required to operate the respective components under the control of the processor 270. In particular, the power supply unit 290 may receive power from, for example, a battery inside the vehicle.

FIGS. 5A to 5H are views referenced to describe a display unit and a gesture sensing unit in accordance with an embodiment of the present invention.

Figure 5A:
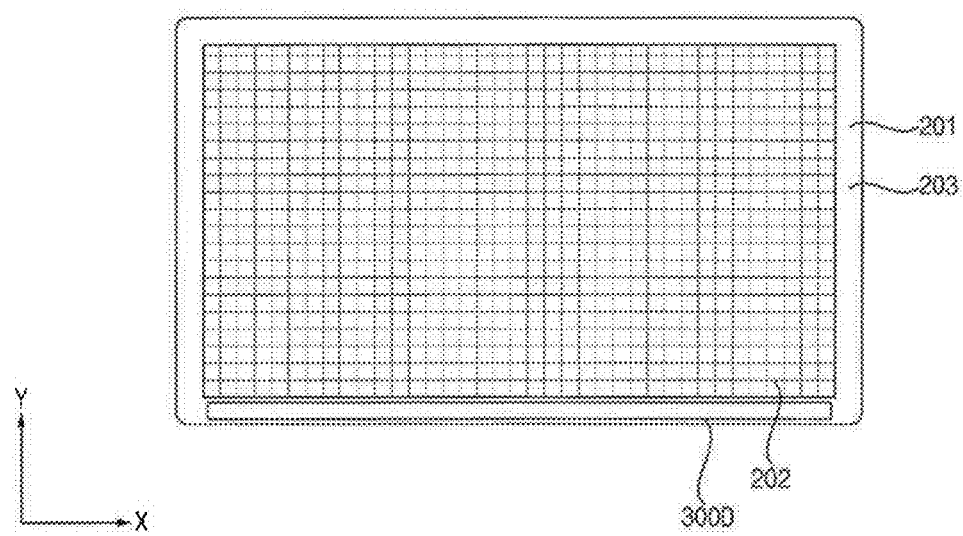
FIGS. 5A to 5H are views referenced to describe a display unit and a gesture sensing unit in accordance with an embodiment of the present invention.
Figure 5B:
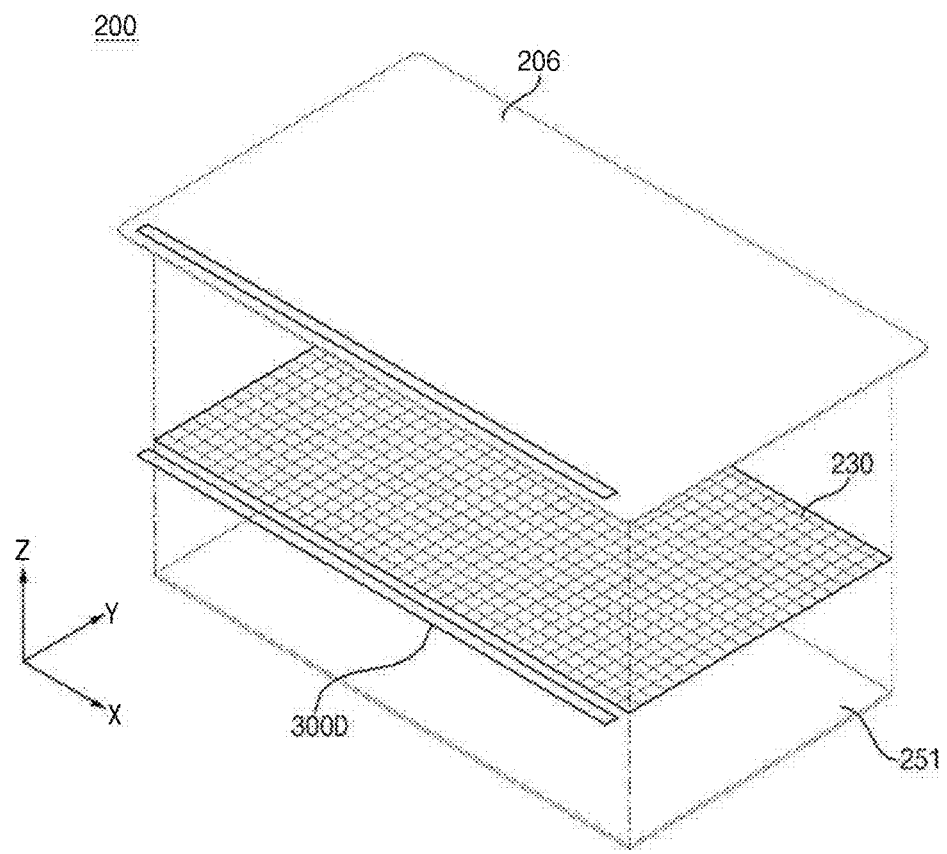

FIG. 5A is a front view of the vehicle display apparatus 200 in accordance with an embodiment of the present invention, and FIG. 5B is an exploded perspective view of the vehicle display apparatus 200 in accordance with an embodiment of the present invention.

Referring to FIGS. 5A and 5B, the vehicle display apparatus 200 may be divided into a display area 202 and a display peripheral area 201, which corresponds to the edge area around the display area 202.

The display unit 251 and the touch sensor unit 230 may be arranged in the display area 202. A bezel frame 203 and a gesture sensing unit 300D may be arranged in the display peripheral area 201.

Although FIGS. 5A and 5B illustrate the gesture sensing unit 300D as being arranged on a lower end region of the display unit 251 in the display peripheral area 201, various other alterations are possible. The gesture sensing unit 300D illustrated in FIGS. 5A and 5B may take the form of a module in which the first light-emitting unit 310, the second light-emitting unit 340, and the light-receiving unit 370 are combined with one another.

Meanwhile, referring to FIG. 5B, the touch sensor unit 230 is disposed underneath an overlay 206, and the display unit 251 is disposed underneath the touch sensor unit 230.

The overlay 206 may enable contact of the user's finger, and may include a conductive element in order to sense capacitance. The overlay 206 may come into contact with the touch sensor unit 230, and more particularly, may come into contact with an electrode array inside the touch sensor unit 230.

Meanwhile, the touch sensor unit 230 may have the same area as the display unit 251. As such, the touch sensor unit 230 may sense touch input over the entire display unit 251.

Meanwhile, the touch sensor unit 230 in accordance with an embodiment of the present invention may sense the approach of the user's hand within a prescribed distance, in addition to a direct touch on the display apparatus 200. Such approach of the user's hand may be referred to as a floating touch or hover. The following description will be centered on the term "floating touch".

FIGS. 5C to 5H illustrate various embodiments related to the arrangement of the gesture sensing unit 300.

Figure 5C:
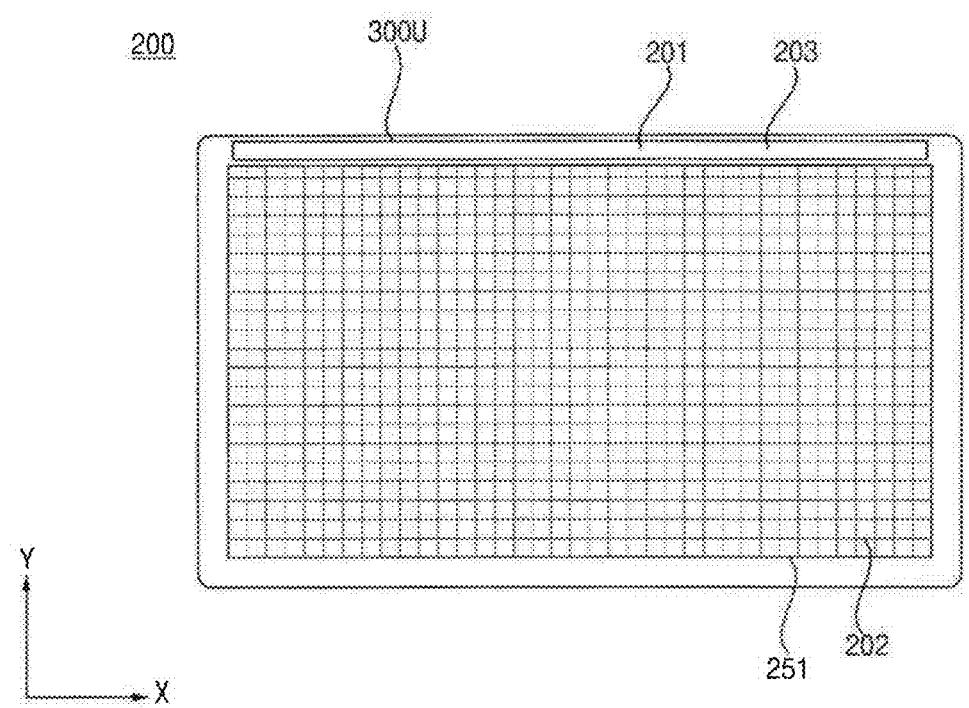
Figure 5D:
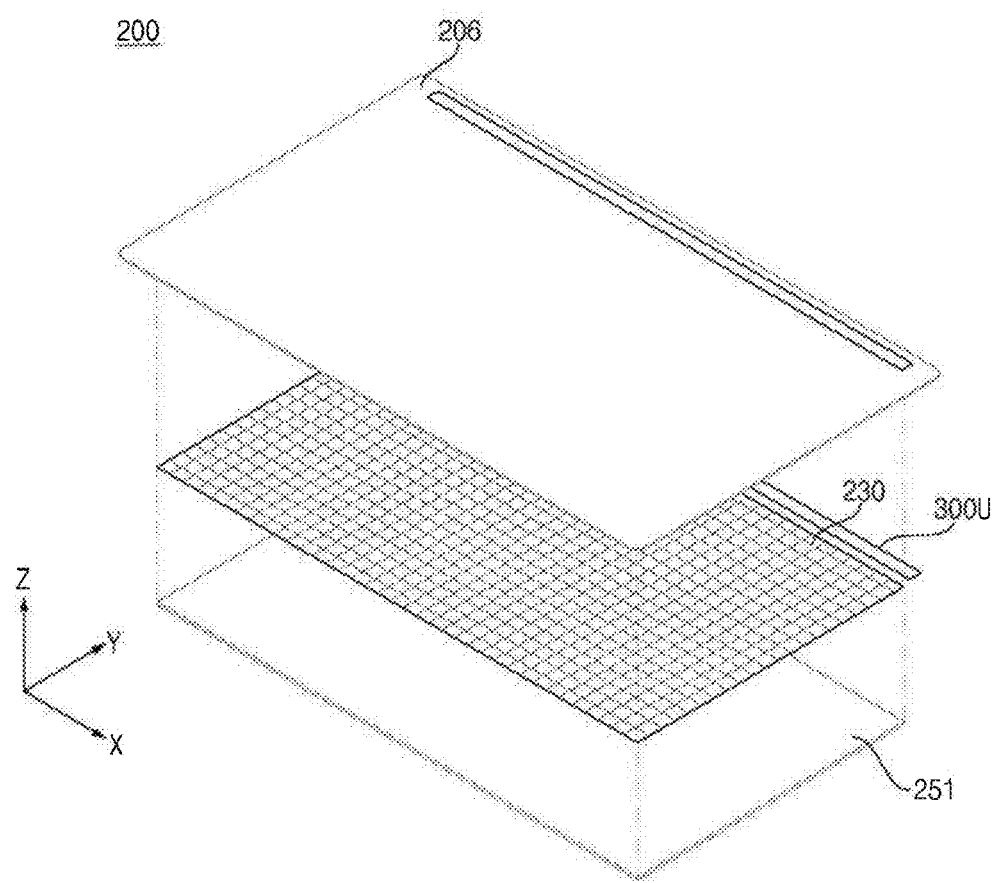

As exemplarily illustrated in FIGS. 5C and 5D, a gesture sensing unit 300U may be located on an upper end region of the display unit 251 in the display peripheral area 201.

Figure 5E:
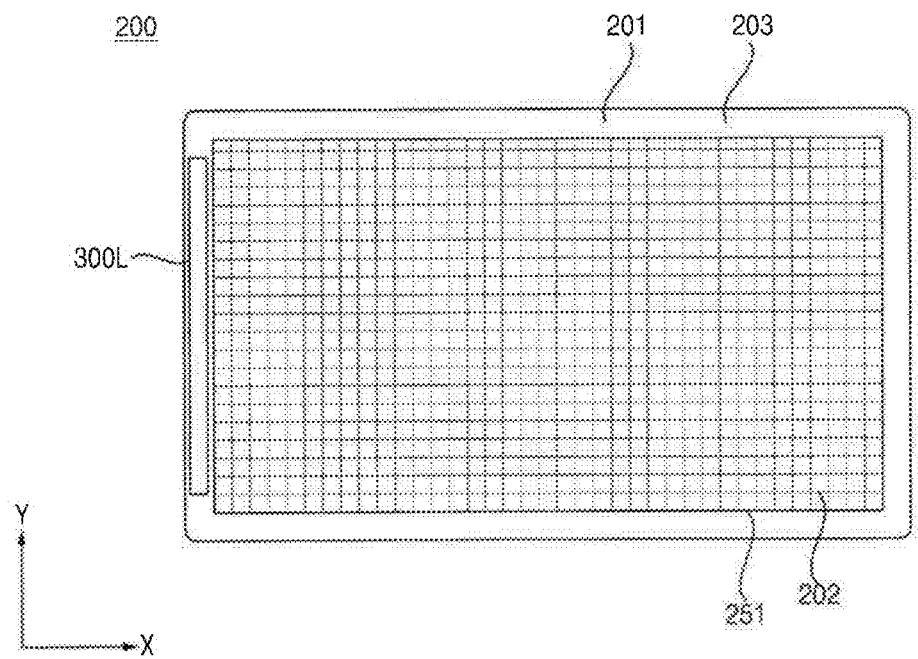
Figure 5F:
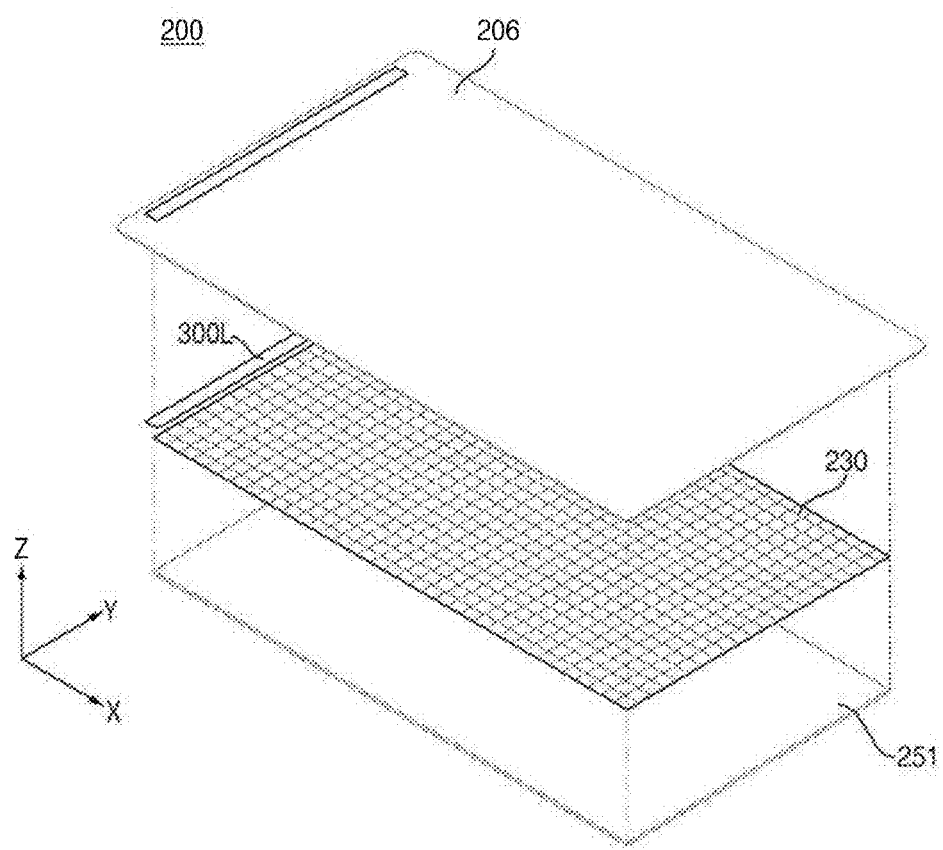

As exemplarily illustrated in FIGS. 5E and 5F, a gesture sensing unit 300L may be located on a left end region of the display unit 251 in the display peripheral area 201.

Figure 5G:
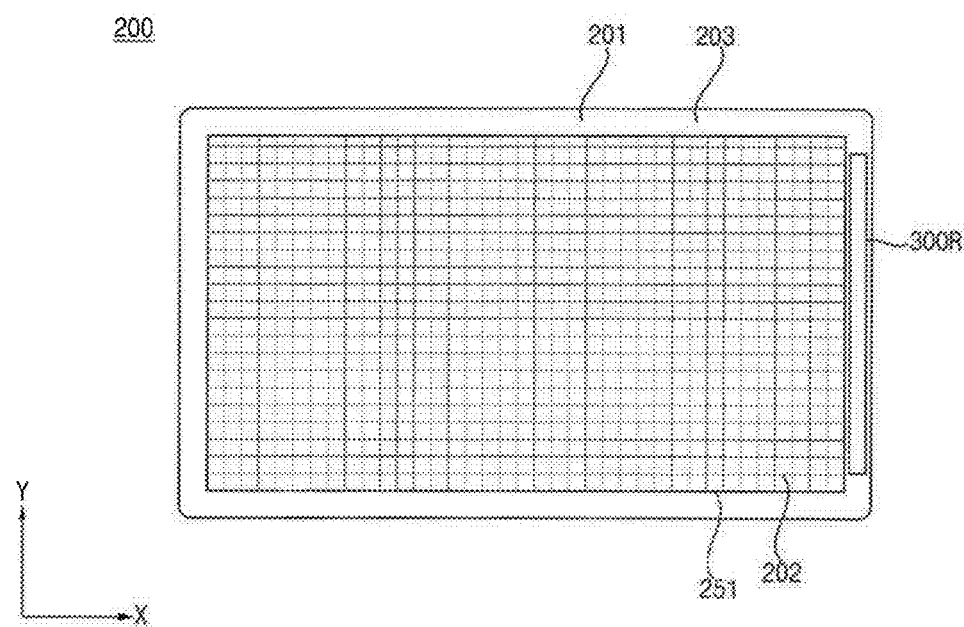
Figure 5H:
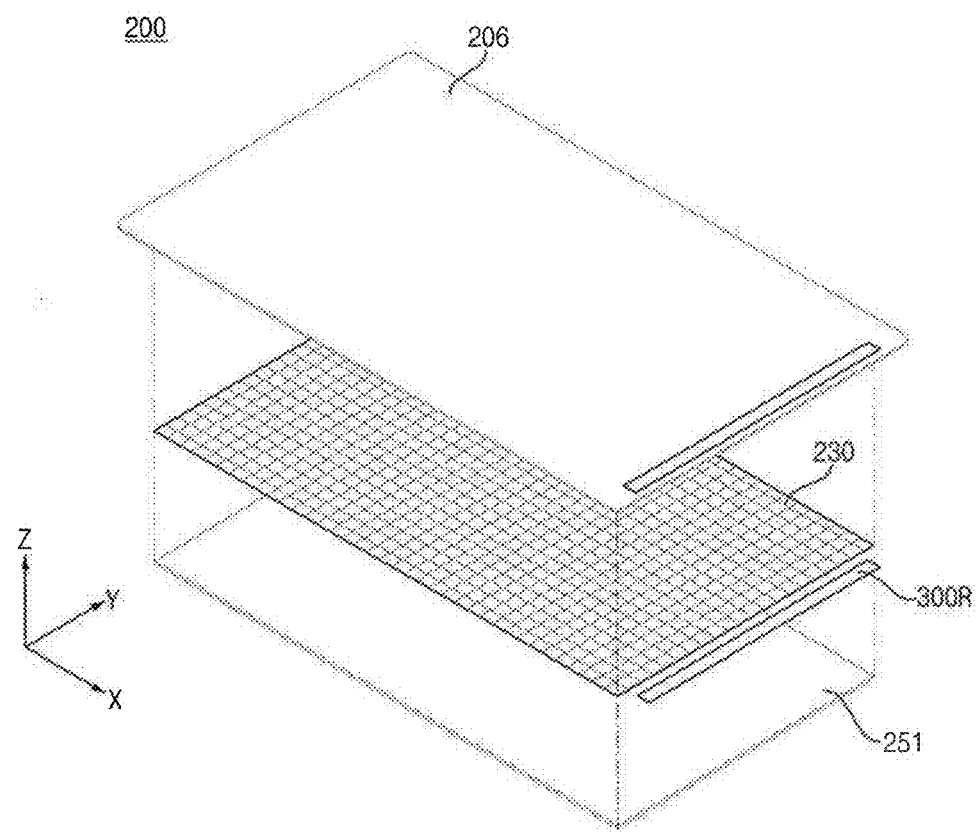

As exemplarily illustrated in FIGS. 5G and 5H, a gesture sensing unit 300L may be located on a right end region of the display unit 251 in the display peripheral area 201.

FIG. 6 is a view illustrating the external appearance of the gesture sensing unit 300 in accordance with an embodiment of the present invention.

Referring to FIG. 6, the gesture sensing unit 300 may include the first light-emitting unit 310, the second light-emitting unit 340, and the light-receiving unit 370.

The first light-emitting unit 310 may emit a first group of rays.

The first light-emitting unit 310 may include a plurality of light source groups 311, 312, 313 and 314 in order to emit the first group of rays. The present disclosure is not limited as to the number of the light source groups 311, 312, 313 and 314.

The respective light source groups 311, 312, 313 and 314 may emit rays in different optical paths.

The respective light source groups 311, 312, 313 and 314 may be arranged in a row and spaced apart from one another by a first distance on the first PCB 319. This arrangement may minimize the space required for the arrangement of the light source groups 311, 312, 313 and 314 and may maximize the sensing of a gesture by the gesture sensing unit 300.

The light source groups may include a first light source group 311, a second light source group 312, a third light source group 313, and a fourth light source group 314.

The first light source group 311 may include a first-a light source module 311*a*, a first-b light source module 311*b*, and a first-c light source module 311*c*. The first-a light source module 311*a*, the first-b light source module 311*b*, and the first-c light source module 311*c* may be arranged parallel to one another.

The respective light source modules 311*a*, 311*b* and 311*c*, included in the first light source group 311, may be arranged in a row and spaced apart from one another by a second distance on the first PCB 319. At this time, the second distance may be smaller than the first distance.

The respective light source modules 311a, 311b and 311c, included in the first light source group 311, may emit rays in different respective paths.

The second light source group 312 may include a second-a light source module 312a, a second-b light source module 312b, and a second-c light source module 312c. The second-a light source module 312a, the second-b light source module 312b, and the second-c light source module 312c may be arranged parallel to one another.

The respective light source modules 312a, 312b and 312c, included in the second light source group 312, may be arranged in a row and spaced apart from one another by a second distance on the first PCB 319. At this time, the second distance may be smaller than the first distance.

The respective light source modules 312a, 312b and 312c, included in the second light source group 312, may emit rays in different respective paths.

The third light source group 313 may include a third—a light source module 313a, a third-b light source module 313b, and a third-c light source module 313c. The third-a light source module 313a, the third-b light source module 313b, and the third-c light source module 313c may be arranged parallel to one another.

The respective light source modules 313a, 313b and 313c, included in the third light source group 313, may be arranged in a row and spaced apart from one another by a second distance on the first PCB 319. At this time, the second distance may be smaller than the first distance.

The respective light source modules 313a, 313b and 313c, included in the third light source group 313, may emit rays in different respective paths.

The fourth light source group 314 may include a fourth-a light source module 314a, a fourth-b light source module 314b, and a fourth-c light source module 314c. The fourth-a light source module 314a, the fourth-b light source module 314b, and the fourth-c light source module 314c may be arranged parallel to one another.

The respective light source modules 314a, 314b and 314c, included in the fourth light source group 314, may be arranged in a row and spaced apart from one another by a second distance on the first PCB 319. At this time, the second distance may be smaller than the first distance.

The respective light source modules 314a, 314b and 314c, included in the fourth light source group 314, may emit rays in different respective paths.

The first light-emitting unit 310 may include the first PCB 319. The light source groups 311, 312, 313 and 314 may be mounted on the first PCB 319.

The second light-emitting unit 340 may emit a second group of rays.

The second light-emitting unit 340 may include a plurality of light source groups 341, 342, 343 and 344 in order to emit the second group of rays. The present disclosure is not limited as to the number of the light source groups 341, 342, 343 and 344.

The respective light source groups 341, 342, 343 and 344 may emit rays in different optical paths.

The respective light source groups 341, 342, 343 and 344 may be arranged in a row and spaced apart from one another by a first distance on the second PCB 349. This arrangement may minimize the space required for the arrangement of the light source groups 341, 342, 343 and 344 and may maximize the sensing of a gesture by the gesture sensing unit 300.

The light source groups may include a first light source group 341, a second light source group 342, a third light source group 343, and a fourth light source group 344.

The first light source group 341 may include a first-a light source module 341a, a first-b light source module 341b, and a first-c light source module 341c. The first-a light source module 341a, the first-b light source module 341b, and the first-c light source module 341c may be arranged parallel to one another.

The respective light source modules 341a, 341b and 341c, included in the first light source group 341, may be arranged in a row and spaced apart from one another by a second distance on the second PCB 349. At this time, the second distance may be smaller than the first distance.

The respective light source modules 341a, 341b and 341c, included in the first light source group 341, may emit rays in different respective paths.

The second light source group 342 may include a second-a light source module 342a, a second-b light source module 342b, and a second-c light source module 342c. The second-a light source module 342a, the second-b light source module 342b, and the second-c light source module 342c may be arranged parallel to one another.

The respective light source modules 342a, 342b and 342c, included in the second light source group 342, may be arranged in a row and spaced apart from one another by a second distance on the second PCB 349. At this time, the second distance may be smaller than the first distance.

The respective light source modules 342a, 342b and 342c, included in the second light source group 342, may emit rays in different respective paths.

The third light source group 343 may include a third-a light source module 343a, a third-b light source module 343b, and a third-c light source module 343c. The third-a light source module 343a, the third-b light source module 343b, and the third-c light source module 343c may be arranged parallel to one another.

The respective light source modules 343a, 343b and 343c, included in the third light source group 343, may be arranged in a row and spaced apart from one another by a second distance on the second PCB 349. At this time, the second distance may be smaller than the first distance.

The respective light source modules 343a, 343b and 343c, included in the third light source group 343, may emit rays in different respective paths.

The fourth light source group 344 may include a fourth-a light source module 344a, a fourth-b light source module 344b, and a fourth-c light source module 344c. The fourth-a light source module 344a, the fourth-b light source module 344b, and the fourth-c light source module 344c may be arranged parallel to one another.

The respective light source modules 344a, 344b and 344c, included in the fourth light source group 344, may be arranged in a row and spaced apart from one another by a second distance on the second PCB 349. At this time, the second distance may be smaller than the first distance.

The respective light source modules 344a, 344b and 344c, included in the fourth light source group 344, may emit rays in different respective paths.

The second light-emitting unit 340 may include the second PCB 349. The light source groups 341, 342, 343 and 344 may be mounted on the second PCB 349.

The second PCB 349 may be disposed so as to form a prescribed angle with the first PCB 319. With this arrangement, the first group of rays and the second group of rays may have different paths.

The second light-emitting unit 340 may be located under the first light-emitting unit 310. The second light-emitting unit 340 may be located under the light-receiving unit 370.

The light-receiving unit 370 may receive reflected rays.

The light-receiving unit 370 may include a plurality of light-receiving modules 371, 372 and 373. The light-receiving modules 371, 372 and 373 may receive a first group of reflected rays and a second group of reflected rays.

The first group of reflected rays may be formed when the first group of rays, generated in the first light-emitting unit 310, is reflected by the object 400.

The second group of reflected rays may be formed when the second group of rays, generated in the second light-emitting unit 340, is reflected by the object 400.

The light-receiving modules 371, 372 and 373 may include a first light-receiving module 371, a second light-receiving module 372, and a third light-receiving module 373.

The first light-receiving module 371 may be located on the Y-axis between the first light source module 311 and the second light source module 312 of the first light-emitting unit 310. In addition, the first light-receiving module 371 may be located on the Y-axis between the first light source module 341 and the second light source module 342 of the second light-emitting unit 340.

The second light-receiving module 372 may be located on the Y-axis between the second light source module 312 and the third light source module 313 of the first light-emitting unit 310. In addition, the second light-receiving module 372 may be located on the Y-axis between the second light source module 342 and the third light source module 343 of the second light-emitting unit 340.

The third light-receiving module 373 may be located on the Y-axis between the third light source module 313 and the fourth light source module 314 of the first light-emitting unit 310. In addition, the third light-receiving module 371 may be located on the Y-axis between the third light source module 343 and the fourth light source module 344 of the second light-emitting unit 340.

The light-receiving unit 370 may include the third PCB 379. The light-receiving modules 371, 372 and 373 may be mounted on the third PCB 379.

The third PCB 379 may be disposed so as to form a prescribed angle with the first PCB 319 and the second PCB 349.

The light-receiving unit 370 may be located between the first light-emitting unit 310 and the second light-emitting unit 340.

The gesture sensing unit 300 may further include the first barrier 306 and the second barrier 307.

The first barrier 306 may be located between the first light-emitting unit 310 and the light-receiving unit 370.

The first barrier 306 may be formed so as to protrude in order to prevent rays emitted from the first light-emitting unit 310 from interfering with reflected rays received by the light-receiving unit 370. For example, the first barrier 306 may be formed so as to protrude from a second housing 302 toward a first housing 301.

The second barrier 307 may be located between the light-receiving unit 370 and the second light-emitting unit 340.

The second barrier 307 may be formed so as to protrude in order to prevent rays emitted from the second light-emitting unit 340 from interfering with reflected rays received by the light-receiving unit 370. For example, the second barrier 307 may be formed so as to protrude from the second housing 302 toward the first housing 301.

The gesture sensing unit 300 may further include housings for defining the external appearance of the gesture sensing unit 300.

The housings may include the first housing 301 and the second housing 302. The first housing 301 may be formed at the front of the first light-emitting unit 310, the second light-emitting unit 340, and the light-receiving unit 370. The first housing 301 may be formed of a transparent material. For example, the first housing 301 may be formed of glass or a transparent synthetic material.

The second housing 302 may be formed so as to be coupled to the first housing 301. The second housing 302 may internally define a space so that the PCBs are received in the space.

Figure 7:
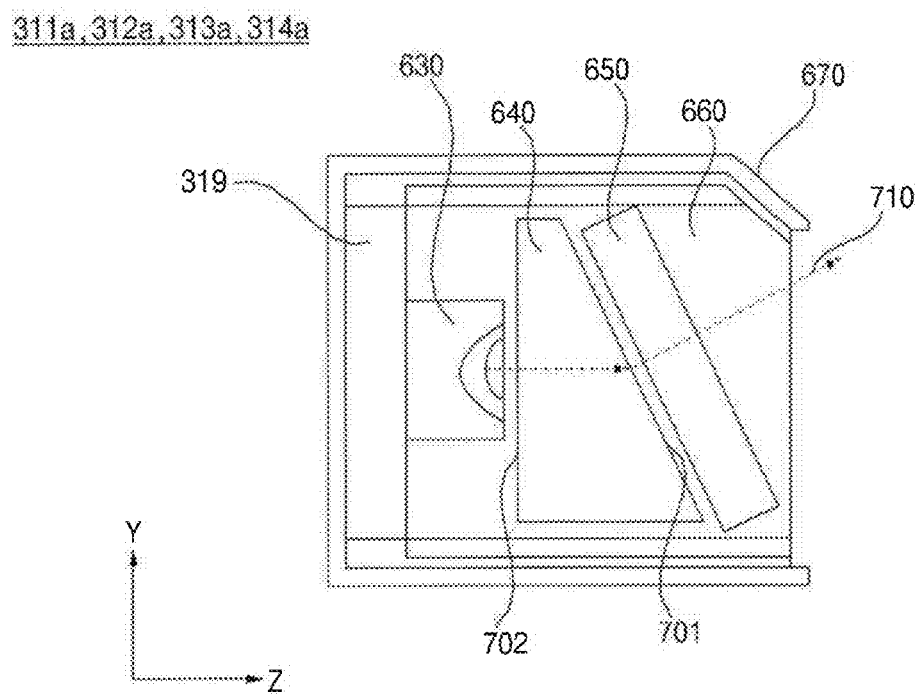
FIG. 7 is a view referenced to describe a light source module included in a first light-emitting unit in accordance with an embodiment of the present invention.

FIG. 7 is a view referenced to describe the light source module included in the first light-emitting unit in accordance with an embodiment of the present invention.

The light source module of FIG. 7 may be any one of the light source modules 311a, 312a, 313a and 314a included in the first light-emitting unit 310.

Each of the light source modules 311a, 312a, 313a and 314a may include an infrared light source 630, a wedge lens 640, and a beam shaper 650.

The infrared light source 630 may generate an infrared ray. The infrared light source 630 may use an infrared LED.

The infrared light source 630 may be disposed on the first PCB 319. For example, a plurality of infrared light sources 630 may be arranged in a row and spaced apart from one another by a prescribed distance on the first PCB 319. For example, the infrared light sources 630 may be grouped so as to be arranged in a row on the first PCB 319.

The infrared light sources 630 may be provided in a plural number. Although FIG. 7 illustrates four infrared light sources 630, the number of infrared light sources 630 is not limited thereto.

Meanwhile, rays generated in the infrared light source 630 have a Gaussian beam form.

The infrared light source 630 is disposed on the first PCB 319. The infrared light source 630 may generate an infrared ray 710.

The wedge lens 640 may change the path of infrared ray generated in the infrared light source 630.

The wedge lens 640 may be disposed on the infrared light source 630.

The wedge lens 640 may be provided in a plural number. The present disclosure is not limited as to the number of wedge lenses. For example, the wedge lenses may be provided so as to correspond in number to the number of infrared light sources.

The wedge lens 640 may have an approximately cylindrical shape. An upper surface 701 of the wedge lens 640 may be inclined relative to a lower surface 702 so as to bend the ray 710 generated in the infrared light source 630.

The beam shaper 650 may convert the distribution of energy of the ray 710, received through the wedge lens 640, into a flat top form. The beam shaper 650 may change a ray, having a path changed by the wedge lens 640, into a ray having an even energy distribution.

The beam shaper 650 may be disposed on the wedge lens 640.

The beam shaper 650 may be provided in a plural number. The present disclosure is not limited as to the number of beam shapers. For example, the beam shapers may be provided so as to correspond in number to the number of infrared light sources.

The beam shaper 650 may convert rays having a Gaussian beam form into rays having a flat top form. When rays, having passed through the beam shaper 650, are variously refracted in different directions, the emitted rays may have an almost circular cross section.

As a result of the respective light source modules 311a, 312a, 313a and 314a including the wedge lens 640 and the beam shaper 650, rays, which have an even energy distribution and a flat top form, may be emitted toward the center of the display unit 251. The emission of such rays having an even energy distribution and a flat top form may prevent the occurrence of dead zones, which are a problem in the related art, thus having the effect of improving the recognition rate of an object.

Each of the light source modules 311a, 312a, 313a and 314a may further include a light guide 660 and a light source module housing 670 individually or in combinations thereof.

The light guide 660 may be disposed on the infrared light source 630.

The light guide 660 may guide rays emitted from the infrared light source 630 to the outside. Specifically, the light guide 660 may guide rays, having passed through the beam shaper 650, to the outside. Here, the outside may be a region in which an object is located.

Meanwhile, rays may be totally reflected inside the light guide 660. To this end, the interior of the light guide 660 may be formed of optical glass, and the exterior of the optical glass may be formed of a covering material (e.g. clad).

The light source module housing 670 may define the external appearance of the light source module 311a, 312a, 313a or 314a. The light source module housing 670 may accommodate the first PCB 319, the infrared light source 630, the wedge lens 640, the beam shaper 650, and the light guide 660 therein.

The light source module housing 670 may have an opening formed in one side surface thereof. Rays emitted from the infrared light source 630 may be directed to the outside through the opening formed in the light source module housing 670.

Figure 8:
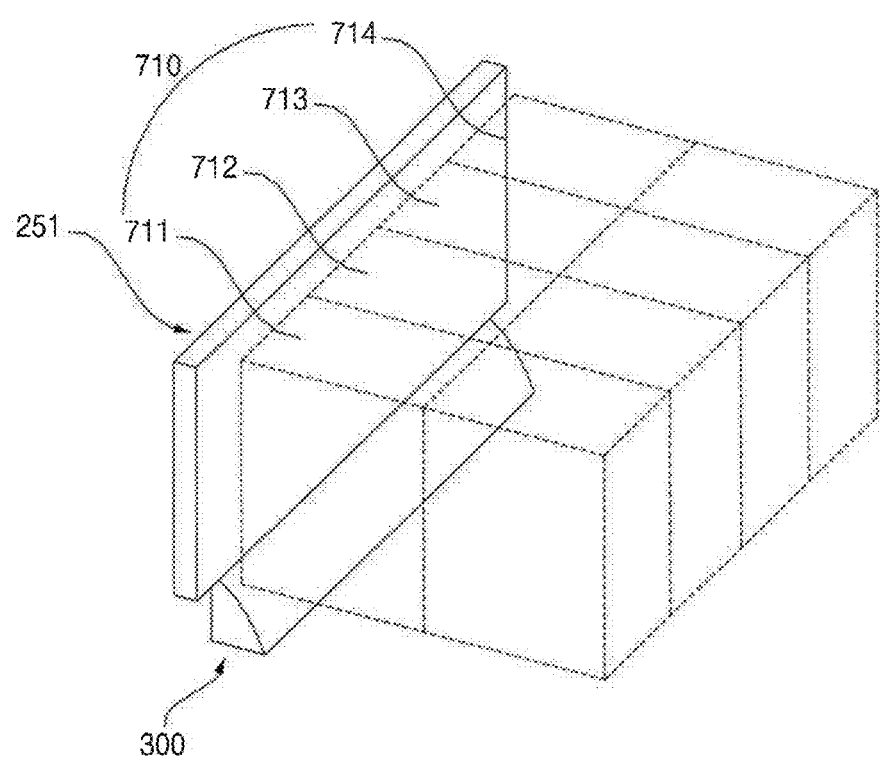
FIG. 8 is a view referenced to describe a space, into which a first group of rays is emitted, in accordance with an embodiment of the present invention.

FIG. 8 is a view referenced to describe a space into which a first group of rays is emitted in accordance with an embodiment of the present invention.

As described above, the first light-emitting unit 310 may include the light source groups 311, 312, 313 and 314 in order to emit a first group of rays. For example, the light source groups 311, 312, 313 and 314 may include the first light source group 311, the second light source group 312, the third light source group 313, and the fourth light source group 314.

The light source groups 311, 312, 313 and 314 may emit rays respectively in different respective paths.

For example, the first light source group 311 may emit rays into a first space 711. The second light source group 312 may emit rays into a second space 712. The third light source group 313 may emit rays into a third space 713. The fourth light source group 314 may emit rays into a fourth space 714.

The first to fourth light source groups 311, 312, 313 and 314 may emit rays respectively at different times under the control of the processor 270.

When an object is located in the first space 711 to the fourth space 714, a first group of reflected rays may be formed.

The processor 270 may determine, based on the time at which the light-receiving unit 370 receives the first group of reflected rays, which one of the rays emitted from the first to fourth light source groups 311, 312, 313 and 314, is the basis on which the object is sensed. Based on the result of determination for the object corresponding to the emitted ray, the processor 270 may determine which of the spaces 711, 712, 713 and 714 on the Z-axis the object is located in.

Meanwhile, the first to fourth spaces 711, 712, 713 and 714 may be spaces defined within a first distance 906 from the display unit 251 on the Z-axis. The first to fourth spaces 711, 712, 713 and 714 may be referred to as spaces in a near field.

Figure 9:
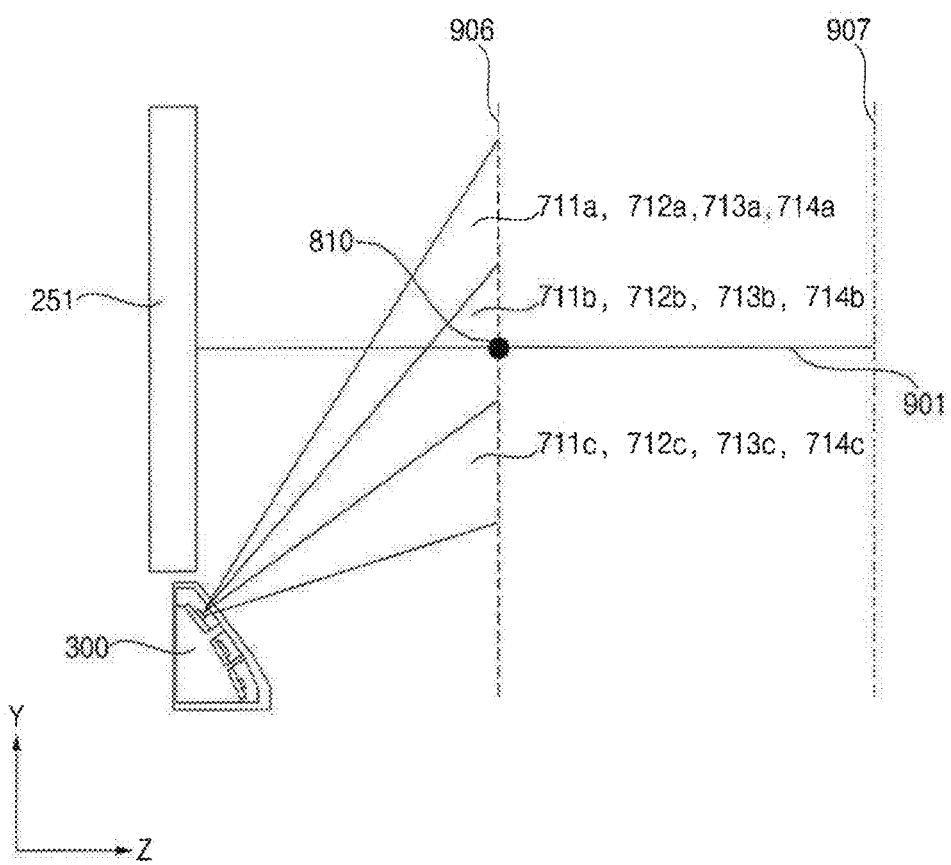
FIGS. 9 and 10 are views referenced to describe the emission of rays from first to fourth light source groups in accordance with an embodiment of the present invention.
Figure 10:
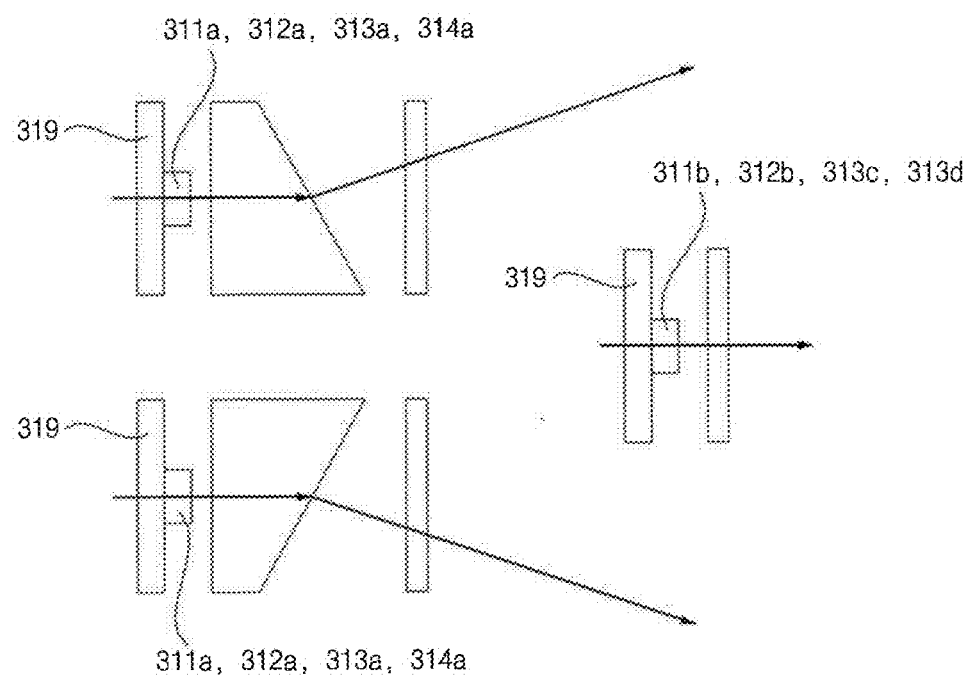

FIGS. 9 and 10 are views referenced to describe the emission of rays from the first to fourth light source groups in accordance with an embodiment of the present invention.

FIGS. 9 and 10 illustrate the space 710 and the first light-emitting unit 310 viewed from the lateral side.

Referring to FIGS. 9 and 10, the first space, described in FIG. 8, may include a first-a space 711a, a first-b space 711b, and a first-c space 711c.

The first-a space 711a may be defined above the first-b space 711b and the first-c space 711c on the Y-axis in a near field.

The first-a light source module 311a may emit a ray into the first-a space 711a. The ray, generated in and emitted from the first-a light source module 311a, may be referred to as a near-top ray.

The first-b space 711b may be defined between the first-a space 711a and the first-c space 711c on the Y-axis in a near field.

The first-b light source module 311b may emit a ray into the first-b space 711b. The ray, generated in and emitted from the first-b light source module 311b, may be referred to as a near-center ray.

The first-c space 711c may be defined under the first-a space 711a and the first-b space 711b on the Y-axis in a near field.

The first-c light source module 311c may emit a ray into the first-c space 711c. The ray, generated in and emitted from the first-c light source module 311c, may be referred to as a near-down ray.

The first-a to first-c light source modules 311a, 311b and 311c may emit rays respectively at different times under the control of the processor 270.

When an object is located in the first-a to first-c spaces 711a, 711b and 711c, a group of rays emitted from the first light source group 311 may be reflected by the object to thereby form reflected rays.

The processor 270 may determine, based on the time at which the reflected rays, formed when the group of rays emitted from the first light source group 311 is reflected by the object, are received, which one of the rays emitted from the first-a to first-c light source modules 311a, 311b and 311c is the basis on which the object is sensed. Based on the result of determination for the object corresponding to the emitted ray, the processor 270 may determine which of the spaces 711a, 711b and 711c on the Y-axis the object is located in.

The second space, described in FIG. 8, may include a second-a space 712a, a second-b space 712b, and a second-c space 712c.

The second-a space 712a may be defined above the second-b space 712b and the second-c space 712c on the Y-axis in a near field.

The second-a light source module 312a may emit a ray into the second-a space 712a. The ray, generated in and emitted from the second-a light source module 312a, may be referred to as a near-top ray.

The second-b space 712b may be defined between the second-a space 712a and the second-c space 712c on the Y-axis in a near field.

The second-b light source module 312b may emit a ray into the second-b space 712b. The ray, generated in and emitted from the second-b light source module 312b, may be referred to as a near-center ray.

The second-c space 712c may be defined under the second-a space 712a and the second-b space 712b on the Y-axis in a near field.

The second-c light source module 312c may emit a ray into the second-c space 712c. The ray, generated in and emitted from the second-c light source module 312c, may be referred to as a near-down ray.

The second-a to second-c light source modules 312a, 312b and 312c may emit rays respectively at different times under the control of the processor 270.

When an object is located in the second-a to second-c spaces 712a, 712b and 712c, a group of rays emitted from the second light source group 312 may be reflected by the object to thereby form reflected rays.

The processor 270 may determine, based on the time at which the reflected rays, formed when the group of rays emitted from the second light source group 312 is reflected by the object, are received, which one of the rays emitted from the second-a to second-c light source modules 312a, 312b and 312c is the basis on which the object is sensed. Based on the result of determination for the object corresponding to the emitted ray, the processor 270 may determine which of the spaces 712a, 712b and 712c on the Y-axis the object is located in.

The third space, described in FIG. 8, may include a third-a space 713a, a third-b space 713b, and a third-c space 713c.

The third-a space 713a may be defined above the third-b space 713b and the third-c space 713c on the Y-axis in a near field.

The third-a light source module 313a may emit a ray into the third-a space 713a. The ray, generated in and emitted from the third-a light source module 313a, may be referred to as a near-top ray.

The third-b space 713b may be defined between the third-a space 713a and the third-c space 713c on the Y-axis in a near field.

The third-b light source module 313b may emit a ray into the third-b space 713b. The ray, generated in and emitted from the third-b light source module 313b, may be referred to as a near-center ray.

The third-c space 713c may be defined under the third-a space 713a and the third-b space 713b on the Y-axis in a near field.

The third-c light source module 313c may emit a ray into the third-c space 713c. The ray, generated in and emitted from the third-c light source module 313c, may be referred to as a near-down ray.

The third-a to third-c light source modules 313a, 313b and 313c may emit rays respectively at different times under the control of the processor 270.

When an object is located in the third-a to third-c spaces 713a, 713b and 713c, a group of rays emitted from the third light source group 313 may be reflected by the object to thereby form reflected rays.

The processor 270 may determine, based on the time at which the reflected rays, formed when the group of rays emitted from the third light source group 313 is reflected by the object, are received, which one of the rays emitted from the third-a to third-c light source modules 313a, 313b and 313c is the basis on which the object is sensed. Based on the result of determination for the object corresponding to the emitted ray, the processor 270 may determine which of the spaces 713a, 713b and 713c on the Y-axis the object is located in.

The fourth space, described in FIG. 8, may include a fourth-a space 714a, a fourth-b space 714b, and a fourth-c space 714c.

The fourth-a space 714a may be defined above the fourth-b space 714b and the fourth-c space 714c on the Y-axis in a near field.

The fourth-a light source module 314a may emit a ray into the fourth-a space 714a. The ray, generated in and emitted from the fourth-a light source module 314a, may be referred to as a near-top ray.

The fourth-b space 714b may be defined between the fourth-a space 714a and the fourth-c space 714c on the Y-axis in a near field.

The fourth-b light source module 314b may emit a ray into the fourth-b space 714b. The ray, generated in and emitted from the fourth-b light source module 314b, may be referred to as a near-center ray.

The fourth-c space 714c may be defined under the fourth-a space 714a and the fourth-b space 714b on the Y-axis in a near field.

The fourth-c light source module 314c may emit a ray into the fourth-c space 714c. The ray, generated in and emitted from the fourth-c light source module 314c, may be referred to as a near-down ray.

The fourth-a to fourth-c light source modules 314a, 314b and 314c may emit rays respectively at different times under the control of the processor 270.

When an object is located in the fourth-a to fourth-c spaces 714a, 714b and 714c, a group of rays emitted from the fourth light source group 314 may be reflected by the object to thereby form reflected rays.

The processor 270 may determine, based on the time at which the reflected rays, formed when the group of rays emitted from the fourth light source group 314 is reflected by the object, are received, which one of the rays emitted from the third-a to fourth-c light source modules 314a, 314b and 314c is the basis on which the object is sensed. Based on the result of determination for the object corresponding to the emitted ray, the processor 270 may determine which of the spaces 714a, 714b and 714c on the Y-axis the object is located in.

Figure 11:
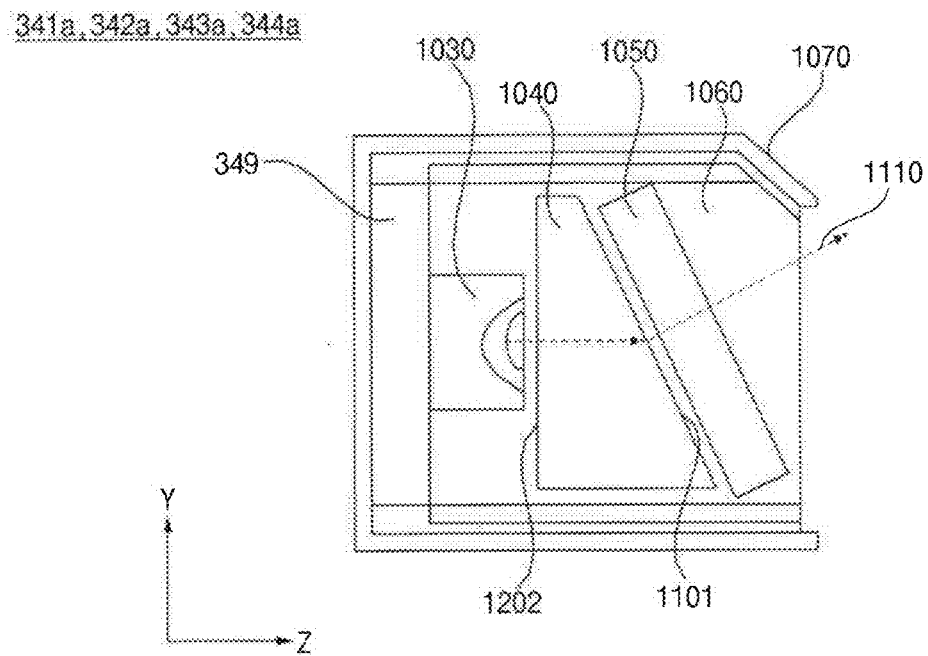
FIG. 11 is a view referenced to describe a light source module included in a second light-emitting unit in accordance with an embodiment of the present invention.

FIG. 11 is a view referenced to describe the light source module included in the second light-emitting unit in accordance with an embodiment of the present invention.

The light source module of FIG. 11 may be any one of the light source modules 341a, 342a, 343a and 344a included in the second light-emitting unit 340.

Each of the light source modules 341a, 342a, 343a and 344a may include an infrared light source 1030, a wedge lens 1040, and a beam shaper 1050.

The infrared light source 1030 may generate an infrared ray. The infrared light source 1030 may use an infrared LED.

The infrared light source 1030 may be disposed on the second PCB 349. For example, a plurality of infrared light sources 1030 may be arranged in a row and spaced apart from one another by a prescribed distance on the second PCB 349. For example, the infrared light sources 1030 may be grouped so as to be arranged in a row on the second PCB 349.

The infrared light sources 1030 may be provided in a plural number. Although FIG. 11 illustrates four infrared light sources 1030, the number of infrared light sources 630 is not limited thereto.

Meanwhile, rays generated in the infrared light source 1030 have a Gaussian beam form.

The infrared light source 1030 is disposed on the second PCB 349. The infrared light source 1030 may generate an infrared ray 1110.

The wedge lens 1040 may change the path of infrared ray generated in the infrared light source 1030.

The wedge lens 1040 may be disposed on the infrared light source 1030.

The wedge lens 1040 may be provided in a plural number. The present disclosure is not limited as to the number of wedge lenses. For example, the wedge lenses may be provided so as to correspond in number to the number of infrared light sources.

The wedge lens 1040 may have an approximately cylindrical shape. An upper surface 1101 of the wedge lens 1040 may be inclined relative to a lower surface 1202 so as to bend the ray 1110 generated in the infrared light source 1030.

The beam shaper 1050 may convert the distribution of energy of the ray 1110, received through the wedge lens 1040, into a flat top form. The beam shaper 1050 may change a ray, having a path changed by the wedge lens 1040, into a ray having an even energy distribution.

The beam shaper 1050 may be disposed on the wedge lens 1040.

The beam shaper 1050 may be provided in a plural number. The present disclosure is not limited as to the number of beam shapers. For example, the beam shapers may be provided so as to correspond in number to the number of infrared light sources.

The beam shaper 1050 may convert rays having a Gaussian beam form into rays having a flat top form. When rays, having passed through the beam shaper 650, are variously refracted in different directions, the emitted rays may have an almost circular cross section.

As a result of the respective light source modules 341*a*, 342*a*, 343*a* and 344*a* including the wedge lens 1040 and the beam shaper 1050, rays, which have an even energy distribution and a flat top form, may be emitted toward the center of the display unit 251. The emission of such rays having an even energy distribution and a flat top form may prevent the occurrence of dead zones, which are a problem in the related art, thus having the effect of improving the recognition rate of an object.

Each of the light source modules 341*a*, 342*a*, 343*a* and 344*a* may further include a light guide 1060 and a light source module housing 1070 individually or in combinations thereof.

The light guide 1060 may be disposed on the infrared light source 1030.

The light guide 1060 may guide rays emitted from the infrared light source 1030 to the outside. Specifically, the light guide 1060 may guide rays, having passed through the beam shaper 1050, to the outside. Here, the outside may be a region in which an object is located.

Meanwhile, rays may be totally reflected inside the light guide 1060. To this end, the interior of the light guide 660 may be formed of optical glass, and the exterior of the optical glass may be formed of a covering material (e.g. clad).

The light source module housing 1070 may define the external appearance of the light source module 341*a*, 342*a*, 343*a* or 344*a*. The light source module housing 1070 may accommodate the second PCB 349, the infrared light source 1030, the wedge lens 1040, the beam shaper 1050, and the light guide 1060 therein.

The light source module housing 1070 may have an opening formed in one side surface thereof. Rays emitted from the infrared light source 1030 may be directed to the outside through the opening formed in the light source module housing 1070.

Figure 12:
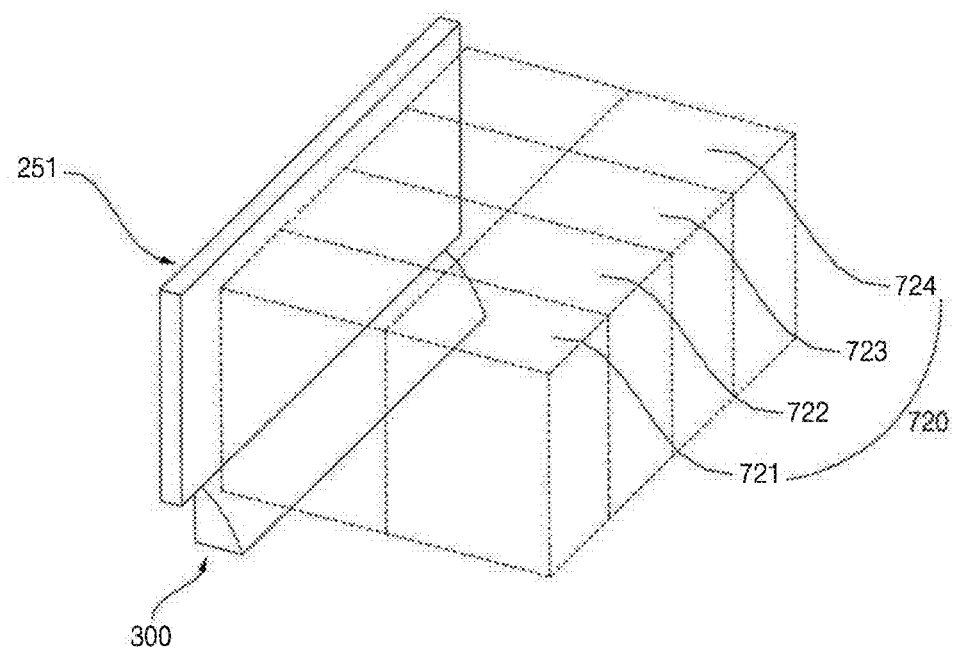
FIG. 12 is a view referenced to describe a space, into which a second group of rays is emitted, in accordance with an embodiment of the present invention.

FIG. 12 is a view referenced to describe a space into which a second group of rays is emitted in accordance with an embodiment of the present invention.

As described above, the second light-emitting unit 340 may include the light source groups 341, 342, 343 and 344 in order to emit a second group of rays. For example, the light source groups 341, 342, 343 and 344 may include the first light source group 341, the second light source group 342, the third light source group 343, and the fourth light source group 344.

The light source groups 341, 342, 343 and 344 may emit rays respectively in different respective paths.

For example, the first light source group 341 may emit a ray into a first space 721. The second light source group 342 may emit a ray into a second space 722. The third light source group 343 may emit a ray into a third space 723. The fourth light source group 344 may emit a ray into a fourth space 724.

The first to fourth light source groups 341, 342, 343 and 344 may emit rays respectively at different times under the control of the processor 270.

When an object is located in the first space 721 to the fourth space 724, a first group of reflected rays may be formed.

The processor 270 may determine, based on the time at which the light-receiving unit 370 receives the second group of reflected rays, which one of the rays emitted from the first to fourth light source groups 341, 342, 343 and 344 is the basis on which the object is sensed. Based on the result of determination for the object corresponding to the emitted ray, the processor 270 may determine which of the spaces 721, 722, 723 and 724 on the Z-axis the object is located in.

Meanwhile, the first to fourth spaces 721, 722, 723 and 724 may be spaces defined between the first distance 906 and a second distance 907 from the display unit 251 on the Z-axis. The second distance 907 is greater than the first distance 906. The first to fourth spaces 721, 722, 723 and 724 may be referred to as spaces in a far field.

Figure 13:
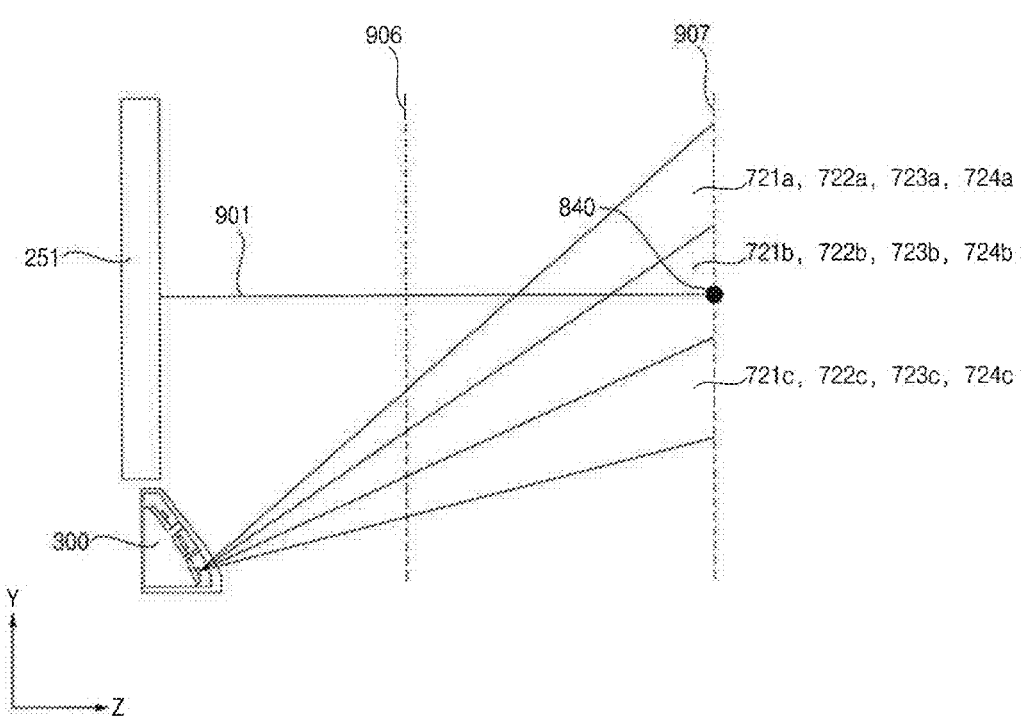
FIGS. 13 and 14 are views referenced to describe the emission of rays from first to fourth light source groups in accordance with an embodiment of the present invention.
Figure 14:
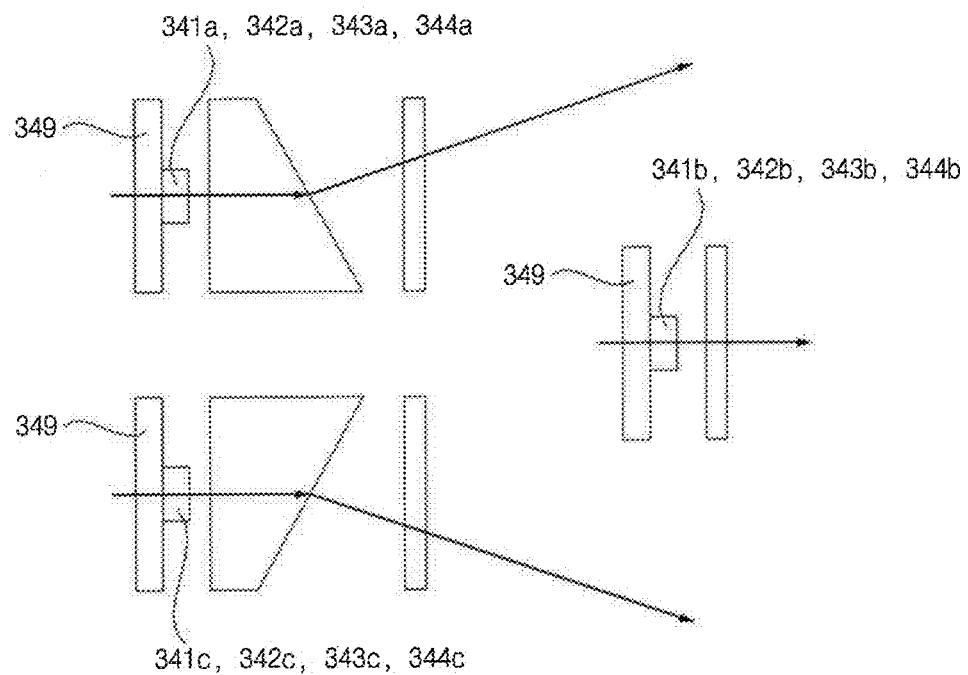

FIGS. 13 and 14 are views referenced to describe the emission of rays from the first to fourth light source groups in accordance with an embodiment of the present invention.

FIGS. 13 and 14 illustrate the space 720 or the second light-emitting unit 340 viewed from the lateral side.

Referring to FIGS. 13 and 14, the first space, described in FIG. 12, may include a first-a space 721*a*, a first-b space 721*b*, and a first-c space 721*c*.

The first-a space 721*a* may be defined above the first-b space 721*b* and the first-c space 721*c* on the Y-axis in a far field.

The first-a light source module 341*a* may emit a ray into the first-a space 721*a*. The ray, generated in and emitted from the first-a light source module 341*a*, may be referred to as a far-top ray.

The first-b space 721*b* may be defined between the first-a space 721*a* and the first-c space 721*c* on the Y-axis in a far field.

The first-b light source module 341*b* may emit a ray into the first-b space 721*b*. The ray, generated in and emitted from the first-b light source module 341*b*, may be referred to as a far-center ray.

The first-c space 721c may be defined under the first-a space 721a and the first-b space 721b on the Y-axis in a far field.

The first-c light source module 341c may emit a ray into the first-c space 721c. The ray, generated in and emitted from the first-c light source module 341c, may be referred to as a far-down ray.

The first-a to first-c light source modules 341a, 341b and 341c may emit rays respectively at different times under the control of the processor 270.

When an object is located in the first-a to first-c spaces 721a, 721b and 721c, a group of rays emitted from the first light source group 341 may be reflected by the object to thereby form reflected rays.

The processor 270 may determine, based on the time at which the reflected rays, formed when the group of rays emitted from the first light source group 341 is reflected by the object, are received, which one of the rays emitted from the first-a to first-c light source modules 341a, 341b and 341c is the basis on which the object is sensed. Based on the result of determination for the object corresponding to the emitted ray, the processor 270 may determine which of the spaces 721a, 721b and 721c on the Y-axis the object is located in.

The second space, described in FIG. 12, may include a second-a space 722a, a second-b space 722b, and a second-c space 722c.

The second-a space 722a may be defined above the second-b space 722b and the second-c space 722c on the Y-axis in a far field.

The second-a light source module 342a may emit a ray into the second-a space 722a. The ray, generated in and emitted from the second-a light source module 342a, may be referred to as a far-top ray.

The second-b space 722b may be defined between the second-a space 722a and the second-c space 722c on the Y-axis in a far field.

The second-b light source module 342b may emit a ray into the second-b space 722b. The ray, generated in and emitted from the second-b light source module 342b, may be referred to as a far-center ray.

The second-c space 722c may be defined under the second-a space 722a and the second-b space 722b on the Y-axis in a far field.

The second-c light source module 342c may emit a ray into the second-c space 722c. The ray, generated in and emitted from the second-c light source module 342c, may be referred to as a far-down ray.

The second-a to second-c light source modules 342a, 342b and 342c may emit rays respectively at different times under the control of the processor 270.

When an object is located in the second-a to second-c spaces 722a, 722b and 722c, a group of rays emitted from the second light source group 342 may be reflected by the object to thereby form reflected rays.

The processor 270 may determine, based on the time at which the reflected rays, formed when the group of rays emitted from the second light source group 342 is reflected by the object, are received, which one of the rays emitted from the second-a to second-c light source modules 342a, 342b and 342c is the basis on which the object is sensed. Based on the result of determination for the object corresponding to the emitted ray, the processor 270 may determine which of the spaces 722a, 722b and 722c on the Y-axis the object is located in.

The third space, described in FIG. 12, may include a third-a space 723a, a third-b space 723b, and a third-c space 723c.

The third-a space 723a may be defined above the third-b space 723b and the third-c space 723c on the Y-axis in a far field.

The third-a light source module 343a may emit a ray into the third-a space 723a. The ray, generated in and emitted from the third-a light source module 343a, may be referred to as a near-top ray.

The third-b space 723b may be defined between the third-a space 723a and the third-c space 723c on the Y-axis in a far field.

The third-b light source module 343b may emit a ray into the third-b space 723b. The ray, generated in and emitted from the third-b light source module 343b, may be referred to as a far-center ray.

The third-c space 723c may be defined under the third-a space 723a and the third-b space 723b on the Y-axis in a far field.

The third-c light source module 343c may emit a ray into the third-c space 723c. The ray, generated in and emitted from the third-c light source module 343c, may be referred to as a far-down ray.

The third-a to third-c light source modules 343a, 343b and 343c may emit rays respectively at different times under the control of the processor 270.

When an object is located in the third-a to third-c spaces 723a, 723b and 723c, a group of rays emitted from the third light source group 343 may be reflected by the object to thereby form reflected rays.

The processor 270 may determine, based on the time at which the reflected rays, formed when the group of rays emitted from the third light source group 343 is reflected by the object, are received, which one of the rays emitted from the third-a to third-c light source modules 343a, 343b and 343c is the basis on which the object is sensed. Based on the result of determination for the object corresponding to the emitted ray, the processor 270 may determine which of the spaces 723a, 723b and 723c on the Y-axis the object is located in.

The fourth space, described in FIG. 12, may include a fourth-a space 724a, a fourth-b space 724b, and a fourth-c space 724c.

The fourth-a space 724a may be defined above the fourth-b space 724b and the fourth-c space 724c on the Y-axis in a far field.

The fourth-a light source module 344a may emit a ray into the fourth-a space 724a. The ray, generated in and emitted from the fourth-a light source module 344a, may be referred to as a far-top ray.

The fourth-b space 724b may be defined between the fourth-a space 724a and the fourth-c space 724c on the Y-axis in a far field.

The fourth-b light source module 344b may emit a ray into the fourth-b space 724b. The ray, generated in and emitted from the fourth-b light source module 344b, may be referred to as a far-center ray.

The fourth-c space 724c may be defined under the fourth-a space 724a and the fourth-b space 724b on the Y-axis in a far field.

The fourth-c light source module 344c may emit a ray into the fourth-c space 724c. The ray, generated in and emitted from the fourth-c light source module 344c, may be referred to as a far-down ray.

The fourth-a to fourth-c light source modules 344a, 344b and 344c may emit rays respectively at different times under the control of the processor 270.

When an object is located in the fourth-a to fourth-c spaces 724a, 724b and 724c, a group of rays emitted from the fourth light source group 344 may be reflected by the object to thereby form reflected rays.

The processor 270 may determine, based on the time at which the reflected rays, formed when the group of rays emitted from the fourth light source group 344 is reflected by the object, are received, which one of the rays emitted from the third-a to fourth-c light source modules 344a, 344b and 344c is the basis on which the object is sensed. Based on the result of determination for the object corresponding to the emitted ray, the processor 270 may determine which of the spaces 724a, 724b and 724c on the Y-axis the object is located in.

Figure 15:
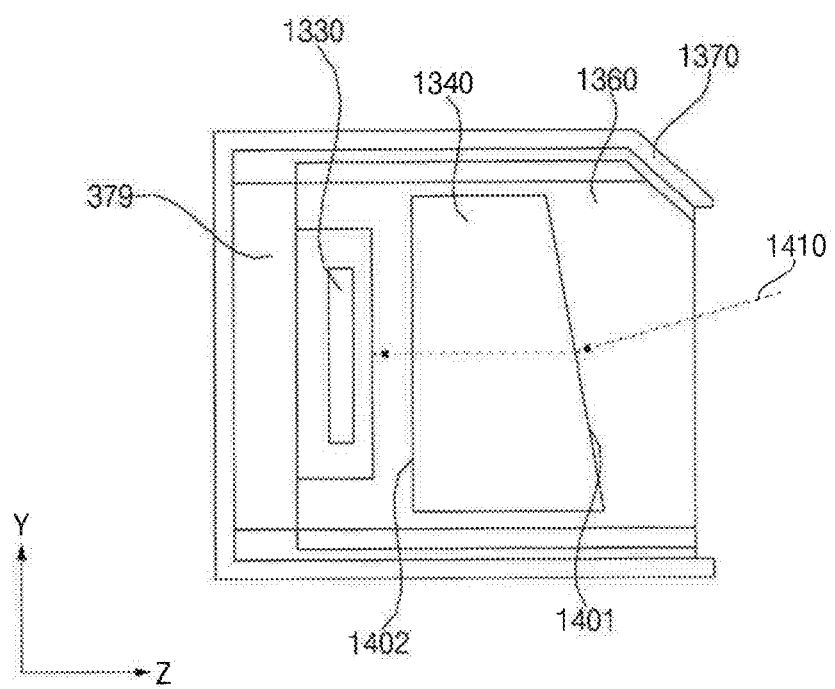
FIG. 15 is a view referenced to describe a light-receiving module included in a light-receiving unit in accordance with an embodiment of the present invention.

FIG. 15 is a view referenced to describe the light-receiving module included in the light-receiving unit in accordance with an embodiment of the present invention.

The light-receiving module of FIG. 15 may be any one of the light-receiving modules 371, 372 and 373 included in the light-receiving unit 370.

Each of the light-receiving modules 371, 372 and 373 may include a photodiode 1330 and a wide-angle lens 1340.

The photodiode 1330 may convert received rays into electrical signals. The converted electrical signals may be input to the processor 270.

The photodiode 1330 may be disposed on the third PCB 379. For example, a plurality of photodiodes 1330 may be arranged in a row and spaced apart from one another by a prescribed distance on the third PCB 379.

The wide-angle lens 1340 may have an approximately cylindrical shape. An upper surface 1402 of the wedge lens 1340 may be inclined relative to a lower surface 1402 so as to bend a reflected ray 1410 received from the outside.

By providing the light-receiving module 371, 372 or 373 with the wide-angle lens 1340, the path of ray may be changed so that the reflected ray 1410 is directed to the photodiode 1330. Thereby, the light-receiving module 371, 372 or 373 may achieve an increased rate of reception of rays.

The respective light-receiving modules 371, 372 and 373 may further include a light guide 1360 and a light-receiving module housing 1370 individually or in combinations thereof.

The light guide 1360 may be disposed on the photodiode 1330.

The light guide 1360 may guide reflected rays received from the outside to the photodiode 1330. Specifically, the light guide 1360 may guide reflected rays to the wide-angle lens 1340.

Meanwhile, rays may be totally reflected inside the light guide 1360. To this end, the interior of the light guide 1360 may be formed of optical glass, and the exterior of the optical glass may be formed of a covering material (e.g. clad).

The light-receiving module housing 1370 may define the external appearance of the light source module 371, 372 or 373. The light source module housing 1370 may accommodate the third PCB 379, the photodiode 1330, the wide-angle lens 1340, and the light guide 1360.

The light-receiving module housing 1370 may have an opening formed in one side surface thereof. Reflected rays from the outside may be transmitted to the photodiode through the opening formed in the light-receiving module housing 1370.

Figure 16:
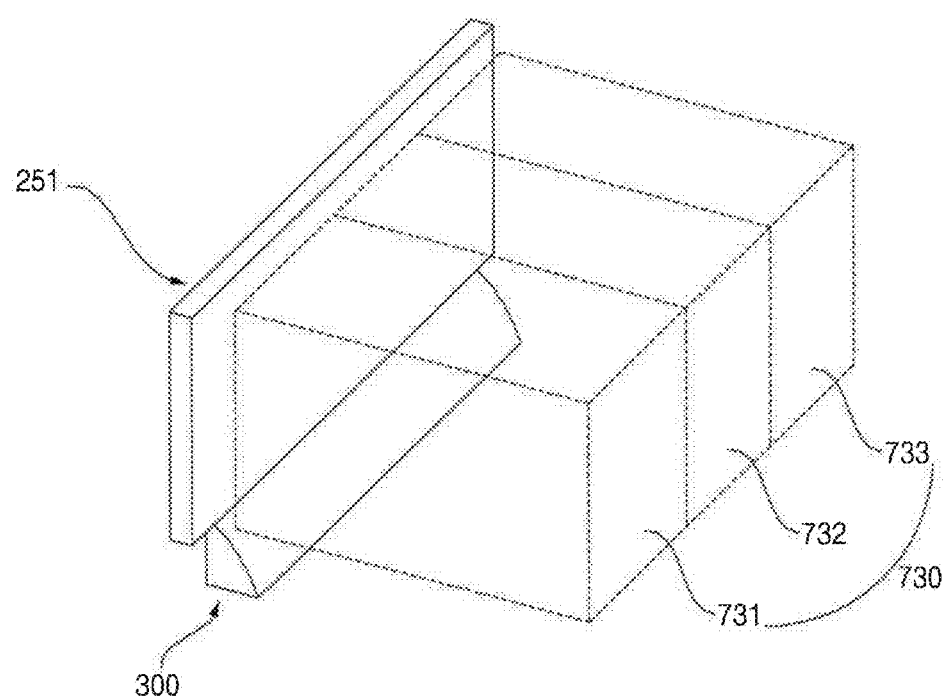
FIGS. 16 and 17 are views referenced to describe a space for receiving reflected rays in accordance with an embodiment of the present invention.
Figure 17:
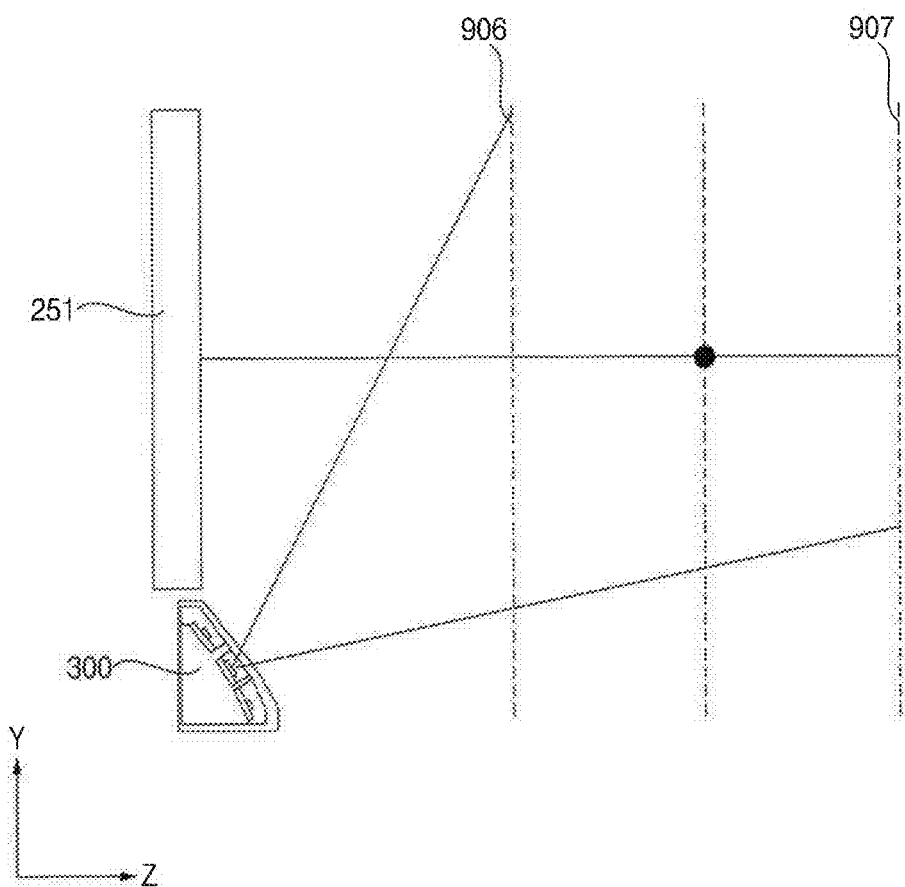

FIGS. 16 and 17 are views referenced to describe a space for receiving reflected rays in accordance with an embodiment of the present invention.

As described above, the light-receiving unit 370 may include the light-receiving modules 371, 372 and 373 in order to receive reflected rays. The light-receiving modules 371, 372 and 373 may receive a first group of reflected rays and a second group of reflected rays.

For example, the first light-receiving module 371 may receive a reflected ray in a first space 731. The second light-receiving module 372 may receive a reflected ray in a second space 732. The third light-receiving module 373 may receive a reflected ray in a third space 733.

The processor 270 may determine, based on the time at which the light-receiving unit 370 receives the reflected ray, which of the light source modules 311a, 311b, 311c, 312a, 312b, 312c, 313a, 313b, 313c, 314a, 314b, 314c, 341a, 341b, 341c, 342a, 342b, 342c, 343a, 343b, 343c, 344a, 344b and 344c the reflected ray is output from.

The light-receiving unit 370 may receive reflected rays within the second distance 907. The light-receiving unit 370 may receive reflected rays in a near field and a far field.

Figure 19:
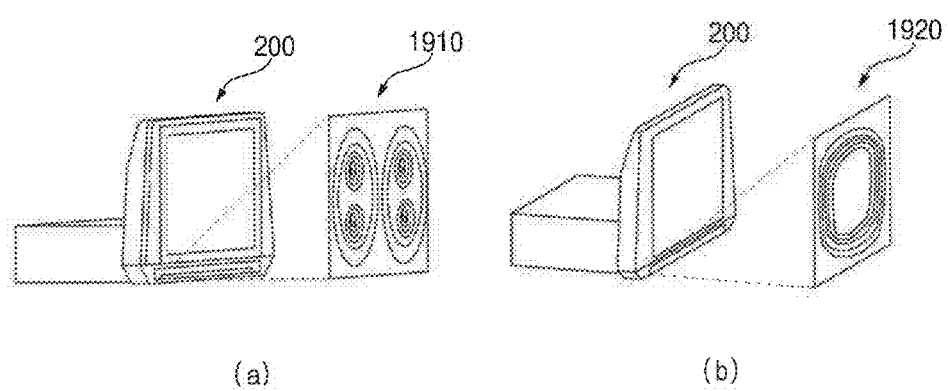

FIGS. 18 and 19 are views referenced to describe the distribution of energy of emitted rays when a beam shaper is included in accordance with an embodiment of the present invention.

FIG. 18(a) is a diagram illustrating the distribution of rays generated in the infrared light source 630 or 1030. The rays generated in the infrared light source 630 or 1030 have a Gaussian distribution as illustrated. In FIG. 18(a), the bright color represents high luminous distribution, and the dark color represents low luminous distribution. It can be appreciated that the distribution of rays is uneven in FIG. 18(a).

Meanwhile, in the case where the wedge lens 640 or 1040 and the beam shaper 650 or 1050 are not provided, as illustrated in FIG. 19(a), rays emitted from the first light-emitting unit 310 or the second light-emitting unit 340 are not evenly distributed at least in the region in which the infrared light source is located. Here, reference numeral 1910 indicates the diagrammatically illustrated distribution of rays emitted from the first light-emitting unit 310 or the second light-emitting unit 340 in the case where the wedge lens 640 or 1040 and the beam shaper 650 or 1050 are not provided.

FIG. 18(b) is a diagram illustrating the distribution of energy of rays that have passed through the beam shaper 650 or 1050 after being generated in the infrared light source 630 or 1030. The rays having passed through the beam shaper 650 or 1050 may have a flat top form. It can be appreciated that the rays are more evenly distributed in FIG. 18(a) than in FIG. 18(b).

Meanwhile, in the case where the wedge lens 640 or 1040 and the beam shaper 650 or 1050 are provided, as illustrated in FIG. 19(b), rays emitted from the first light-emitting unit 310 or the second light-emitting unit 340 may be evenly distributed so as to cover the entire display unit 251. Here, reference numeral 1920 indicates the diagrammatically illustrated distribution of rays emitted from the first light-emitting unit 310 or the second light-emitting unit 340 in the case where the wedge lens 640 or 1040 and the beam shaper 650 or 1050 are provided.

As described above, the vehicle display apparatus 200 in accordance with the embodiments of the present invention may achieve the even distribution of rays in an object recognition region, which may result in a wide object recognition range and high accuracy in the implementation of various gestures FIGS. 20 to 23 are views referenced to describe the operation of the vehicle display apparatus in response to the reception of a gesture in accordance with an embodiment of the present invention.

A first group of reflected rays is formed when a first group of rays is scattered or reflected by the object 400.

A second group of reflected rays is formed when a second group of rays is scattered or reflected by the object 400.

When the second group of reflected rays is received in the state in which a prescribed menu or item is highlighted, the processor 270 may provide a first control signal.

When the first group of reflected rays and the second group of reflected rays are received in the state in which a prescribed menu or item is highlighted, the processor 270 may provide a second control signal.

Referring to FIG. 20, the vehicle display apparatus 200 may be paired with a mobile terminal via the short-range communication module 213. The vehicle display apparatus 200 may receive a phone list from the mobile terminal, and display the same on the display unit 251.

When the user's hand 400 is located in a far field 720 so that a second group of reflected rays is received in the state in which one contact 2031 on the phone list is highlighted, the processor 270 may provide a first control signal for making a call with the highlighted contact 2031.

For example, the processor 270 may display the highlighted contact 2031 on the display unit 251. In this case, the user's hand 400 may be located in the far field 720 so that the second group of reflected rays may be formed. The light-receiving unit 370 may receive the second group of reflected rays. When the second group of reflected rays is received, the processor 270 may generate the first control signal for making a call with the highlighted contact 2031. The generated first control signal may be transmitted to the mobile terminal via the short-range communication module 213. The owner of the mobile terminal may make a call with the contact 2031. At this time, the processor 270 may display an indicator 2032 for showing the connection of a call on the display unit 251.

When the user's hand 400 is located in a near field 710 so that a first group of reflected rays and a second group of reflected rays are received in the state in which one person 2031 of the phone list is highlighted, the processor 270 may provide a second control signal for sending a text message to the highlighted contact 2031.

For example, the processor 270 may display the highlighted contact 2031 on the display unit 251. In this case, the user's hand 400 may be located in the near field 710 so that the first group of reflected rays and the second group of reflected rays may be formed. The light-receiving unit 370 may receive the first group of reflected rays and the second group of reflected rays. When the first group of reflected rays and the second group of reflected rays are received, the processor 270 may generate the second control signal for sending a text message to the highlighted contact 2031. The generated second control signal may be transmitted to the mobile terminal via the short-range communication module 213. The owner of the mobile terminal may enter a mode for making a text message that will be sent to the contact 2031. At this time, the processor 270 may display an indicator 2033 for showing the text message creation mode on the display unit 251.

Referring to FIG. 21, the vehicle display apparatus 200 may provide a control signal to the air conditioner drive unit 155 via the interface unit 280.

When the user's hand 400 is located in the far field 720 so that the second group of reflected rays is received in the state in which an air-conditioning menu is selected, the processor 270 may provide a first control signal for selecting a temperature adjustment item in the selected air-conditioning menu.

For example, the processor 270 may display a selected air-conditioning menu icon 2131 on the display unit 251. In this case, because the user's hand 400 is located in the far field 720, the second group of reflected rays may be generated. The light-receiving unit 370 may receive the second group of reflected rays. When the second group of reflected rays is received, the processor 270 may generate the first control signal for selecting the temperature adjustment item in the air-conditioning menu. The generated first control signal may be transmitted to the air conditioner drive unit 155 via the interface unit 280. At this time, the processor 270 may display a temperature adjustment indicator 2132 on the display unit 251.

When the user's hand 400 is located in the near field 710 so that the first group of reflected rays and the second group of reflected rays are received in the state in which the air-conditioning menu is selected, the processor 270 may provide a second control signal for selecting an air-flow adjustment item in the selected air-conditioning menu.

For example, the processor 270 may display the selected air-conditioning menu icon 2131 on the display unit 251. In this case, because the user's hand 400 is located in the near field 710, the first group of reflected rays and the second group of reflected rays may be generated. The light-receiving unit 370 may receive the first group of reflected rays and the second group of reflected rays. When the first group of reflected rays and the second group of reflected rays are received, the processor 270 may generate the second control signal for selecting the air-flow adjustment item in the air-conditioning menu. The generated second control signal may be transmitted to the air conditioner drive unit 155 via the interface unit 280. At this time, the processor 270 may display an air-flow adjustment indicator 2133 on the display unit 251.

Referring to FIG. 22, when the user's hand 400 is located in the far field 720 so that the second group of reflected rays is received in the state in which an Audio Video (AV) menu is selected, the processor 270 may provide a first control signal for selecting a radio item in the selected AV menu.

For example, the processor 270 may display a selected AV menu icon 2231 on the display unit 251. In this case, because the user's hand 400 is located in the far field 720, the second group of reflected rays may be generated. The light-receiving unit 370 may receive the second group of reflected rays. When the second group of reflected rays is received, the processor 270 may generate the first control signal for selecting the radio item in the AV menu. The processor 270 may select the radio item in the AV menu in response to the first control signal. At this time, the processor 270 may display a radio indicator 2232 on the display unit 251.

When the user's hand 400 is located in the near field 710 so that the first group of reflected rays and the second group of reflected rays are received in the state in which the AV menu is selected, the processor 270 may provide a second control signal for selecting an MP3 item in the selected AV menu.

For example, the processor 270 may display the selected AV menu icon 2231 on the display unit 251. In this case, because the user's hand 400 is located in the near field 710, the first group of reflected rays and the second group of reflected rays may be generated. The light-receiving unit 370 may receive the first group of reflected rays and the second group of reflected rays. When the first group of reflected rays and the second group of reflected rays are received, the processor 270 may generate the second control signal for selecting the MP3 item in the AV menu. The processor 270 may select the MP3 item in the AV menu in response to the second control signal. At this time, the processor 270 may display an MP3 indicator 2233 on the display unit 251.

Referring to FIG. 23, when the user's hand 400 is located in the far field 720 so that the second group of reflected rays is received in the state in which a navigation menu is selected, the processor 270 may provide a first control signal for selecting a destination setting item in the selected navigation menu.

For example, the processor 270 may display a selected navigation menu icon 2331 on the display unit 251. In this case, because the user's hand 400 is located in the far field 720, the second group of reflected rays may be generated. The light-receiving unit 370 may receive the second group of reflected rays. When the second group of reflected rays is received, the processor 270 may generate the first control signal for selecting the destination setting item in the navigation menu. The processor 270 may select the destination setting idem in the AV menu in response to the first control signal. At this time, the processor 270 may display a radio indicator 2332 on the display unit 251.

When the user's hand 400 is located in the near field 710 so that the first group of reflected rays and the second group of reflected rays are received in the state in which the navigation menu is selected, the processor 270 may provide a second control signal for selecting a route setting item in the selected navigation menu.

For example, the processor 270 may display the selected navigation menu icon 2331 on the display unit 251. In this case, because the user's hand 400 is located in the near field 710, the first group of reflected rays and the second group of reflected rays may be generated. The light-receiving unit 370 may receive the first group of reflected rays and the second group of reflected rays. When the first group of reflected rays and the second group of reflected rays are received, the processor 270 may generate the second control signal for selecting the route setting item in the navigation menu. The processor 270 may select the route setting item in the navigation menu in response to the second control signal. At this time, the processor 270 may display a route setting indicator 2333 on the display unit 251.

Figure 24A:
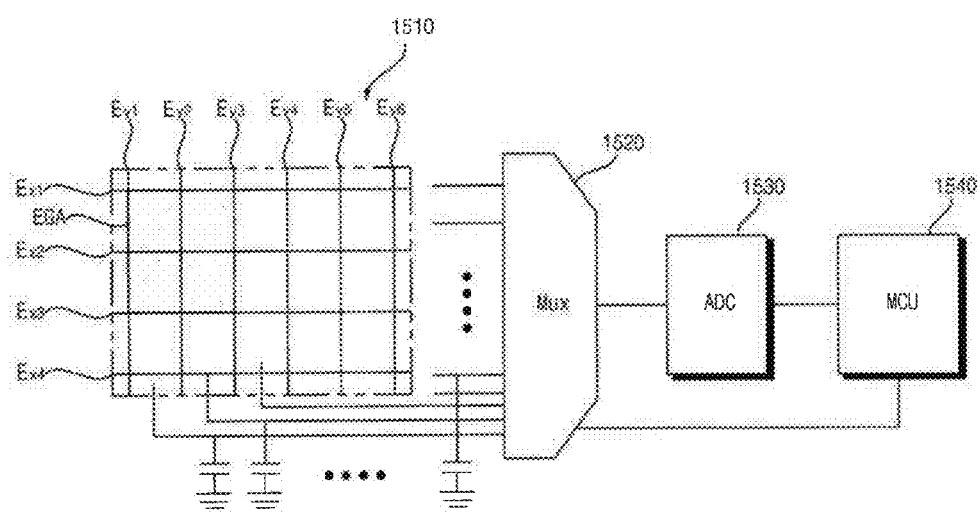
FIGS. 24A and 24B are views referenced to describe a touch input unit in accordance with an embodiment of the present invention.
Figure 24B:
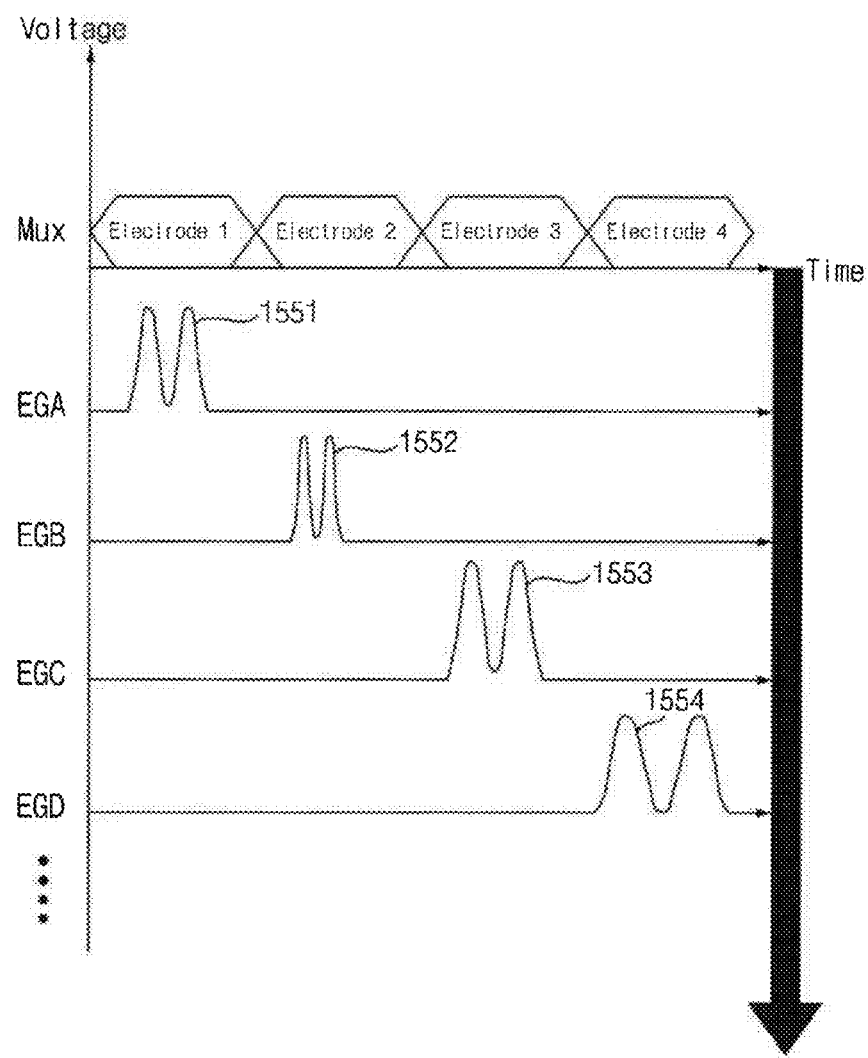

FIGS. 24A and 24B are views referenced to describe the touch input unit in accordance with an embodiment of the present invention.

First, FIG. 24A illustrates a portion of an electrode array 1510 inside the touch sensor unit 230.

The electrode array 1510 may include horizontal electrodes Ex1, Ex2, Ex3 and Ex4 and vertical electrodes Ey1, Ey2, Ey3, Ey4, Ey5 and Ey6.

In particular, in FIG. 24A, variation in capacitance is sensed in units of four electrode cells. Signals related to variation in capacitance sensed by the electrode cells are mixed in a Mux 1520, are converted into digital signals in an ADC 1530, and are signal-processed in an MCU 1540.

The MCU 1540 may calculate X-axis, Y-axis, and Z-axis information regarding floating touch input based on the converted digital signals.

Meanwhile, in the case where the size of touch sensing cells (i.e. grouped electrodes) corresponds to the four electrode cells as illustrated in FIG. 24A, the MCU 1540 may apply electrical signals only to a first horizontal electrode Ex1 and a third horizontal electrode Ex3 among the horizontal electrodes Ex1, Ex2, Ex3 and Ex4, and may apply electrical signals only to first, third, and fifth vertical electrodes Ey1, Ey3 and Ey5 among the vertical electrodes Ey1, Ey2, Ey3, Ey4, Ey5 and Ey6. As such, the size of the touch sensing cells (i.e. grouped electrodes) may be set so as to correspond to the four electrode cells.

Meanwhile, the MCU 1540 may be included in the processor 270 described above.

Meanwhile, the size of the touch sensing cells (i.e. grouped electrodes) may be set in various ways so as to correspond to the position of the user's hand or finger, such as 1×1, 2×2, 3×3 or 2×7.

Next, FIG. 24B illustrates variation in capacitance sensed by the electrode array 1510 inside the touch sensor unit 230.

FIG. 24B illustrates that capacitance variation signals 1551, 1552, 1553 and 1554 are sensed by a plurality of electrode cells EGA, EGB, EGC and EGD in a time sharing manner. The Mux 1520 may mix the signals 1551, 1552, 1553 and 1554 with one another, thereby outputting mixed analogue signals.

The vehicle display apparatus 200 in accordance with the embodiments of the present invention is a display apparatus, which has a 3D interaction function, and enables proximity touch or spatial recognition.

In particular, when the user's hand, which is located at the front of the vehicle display apparatus 200 in accordance with the embodiment of the present invention, gradually approaches, the vehicle display apparatus 200 may detect all paths, regions and positions of the user's hand until the user's hand performs touch input, and may detect the user's finger when the distance to the user's hand is within a prescribed distance. This may prevent deterioration in the success rate of proximity spatial recognition due to issues related to resolution, viewing angle and the like. Here, the prescribed distance may be a distance that enables a floating touch.

To this end, the vehicle display apparatus 200 may include the gesture sensing unit 300 (FIG. 5) and the touch sensor unit 230 (FIG. 4) for sensing the user's finger, i.e. a floating touch.

The processor 270 may calculate the position of an object in a plane parallel to the display unit 251 based on the quantity of first reflected rays or the quantity of second reflected rays received by the light-receiving unit 370. Here, the plane parallel to the display unit 251 may be an X-Y plane.

The processor 270 may calculate the approximate distance between the display unit 251 and the object based on the quantity of first reflected rays and the quantity of second reflected rays. Here, the distance between the display unit 251 and the object may be the distance on the Z-axis.

Meanwhile, when the first reflected rays and the second reflected rays are received, the touch sensor unit 230 may be operated upon receiving power. That is, when the user's hand does not approach within a distance at which the first reflected rays and the second reflected rays are received, the touch sensor unit 230 is not operated, which may reduce unnecessary power consumption.

The touch sensor unit 230 may sense a floating touch. To this end, the touch sensor unit 230 may include an electrode array and an MCU. When the touch sensor unit 230 is operated, electrode signals are supplied to the electrode array, whereby an electric field is created on the electrode array.

Meanwhile, when the user's hand approaches within a distance within which a floating touch is possible, variation in capacitance occurs in the electric field created on the front surface of the display apparatus 200, and the touch sensor unit 130 senses this variation in capacitance. Then, the processor 270 may calculate X-axis and Y-axis information of floating touch input based on the sensed variation in capacitance. In addition, the processor 270 may calculate Z-axis information, which is the distance between the display apparatus 200 and the user's hand, based on the intensity of variation in capacitance.

At this time, the grouping of the electrode array inside the touch sensor unit 230 may vary based on the Z-axis information, which is the distance to the user's hand, calculated based on information from the gesture sensing unit 300 (FIG. 5). The size of the electrode array may be set so as to be reduced as the distance between the display unit 251 and the user's hand is reduced.

That is, the size of touch sensing cells with respect to the electrode array inside the touch sensor unit 230 may change based on the Z-axis information, which is the distance to the user's hand, calculated based on information from the gesture sensing unit 300 (FIG. 5).

In one example, when first reflected rays and second reflected rays are received, the grouping of the electrode array may be performed in a manner such that touch sensing cells (i.e. grouped electrodes) have a first size corresponding to nine electrode cells. When only second reflected rays are received, touch sensing cells (i.e. grouped electrodes) may have a second size corresponding to four electrode cells.

In another example, when first reflected rays and second reflected rays are received, the grouping of the electrode array may be performed in a manner such that touch sensing cells (i.e. grouped electrodes) have a first size corresponding to four electrode cells. When only second reflected rays are received, touch sensing cells (i.e. grouped electrodes) may have a second size corresponding to a single electrode cell.

That is, the size of touch sensing cells may be set so as to be reduced as the distance between the display unit 251 and the user's hand is reduced.

Meanwhile, the change in the size of the touch sensing cells (i.e. grouped electrodes) may be performed by changing electrical signals.

In one example, in the case where the size of touch sensing cells (i.e. grouped electrodes) corresponds to nine electrode cells, electrical signals are applied only to a first horizontal electrode and a fourth horizontal electrode among the first to fourth horizontal electrodes, and electrical signals are applied only to a first vertical electrode and a fourth vertical electrode among the first to fourth vertical electrodes, whereby the size of the touch sensing cells (i.e. grouped electrodes) corresponding to the nine electrode cells may be set.

In another example, in the case where the size of touch sensing cells (i.e. grouped electrodes) corresponds to four electrode cells, electrical signals are applied only to a first horizontal electrode and a third horizontal electrode among the first to third horizontal electrodes, and electrical signals are applied only to a first vertical electrode and a third vertical electrode among the first to third vertical electrodes, whereby the size of the touch sensing cells (i.e. grouped electrodes) corresponding to the four electrode cells may be set.

In a further example, in the case where the size of touch sensing cells (i.e. grouped electrodes) corresponds to a single electrode cell, electrical signals are applied to respective horizontal electrodes and respective vertical electrodes, whereby the size of the touch sensing cells (i.e. grouped electrodes) corresponding to the single electrode cell may be set.

In conclusion, the magnitude of power consumed by the electrode array inside the touch sensor unit 230 may vary depending on the distance to the user's hand. The magnitude of power consumed by the electrode array inside the touch sensor unit 230 may be increased as the distance to the user's hand is reduced.

The present invention as described above may be implemented as code that can be written on a computer readable medium in which a program is recorded and thus read by a computer. The computer readable medium includes all kinds of recording devices in which data is stored in a computer readable manner. Examples of the computer readable recording medium may include a hard disk drive (HDD), a solid state disk (SSD), a silicon disk drive (SDD), a ROM, a RAM, a CD-ROM, a magnetic tape, a floppy disc, and an optical data storage device. In addition, the computer readable medium is implemented in a carrier wave (e.g., data transmission over the Internet). In addition, the computer may include the processor 270 or the controller 170. Thus, the above detailed description should not be construed as limited to the embodiments set forth herein in all terms and be considered by way of example. The scope of the present invention should be determined by the reasonable interpretation of the accompanying claims and all changes in the equivalent range of the present invention are intended to be included in the scope of the present invention.

As is apparent from the above description, the embodiments of the present invention have one or more effects as follows.

First, a gesture sensing unit is integrally formed so as to be located in a region of a display unit, which is advantageous to the use of a space in the center fascia of a vehicle.

Second, a plurality of light-emitting unit is provided, which is advantageous from the aspect of gesture sensing.

Third, a plurality of light-emitting units is provided, which eliminates a dead zone with regard to the recognition of a 3D gesture.

Fourth, the recognition of a 3D gesture provides various simplified human machine interfaces (HMI).

Fifth, a driver can input a gesture while keeping his/her eyes forward during driving, which ensures safe driving.

Sixth, a gesture is sensed using infrared rays, which enables stable gesture sensing without the influence of peripheral visible rays.

Effects of the present invention should not be limited to the aforementioned effects and other not-mentioned effects will be clearly understood by those skilled in the art from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:
1. A display apparatus for a vehicle, comprising:
a display unit;
a gesture sensing device configured to sense a 3D gesture made by an object in front of the display unit; and
a processor configured to control, based on the 3D gesture made by the object, the display unit,
wherein the gesture sensing device includes:

a first light-emitting device configured to emit a first group of rays along a first path, a second light-emitting device configured to emit a second group of rays along a second path, and a light-receiving unit configured to receive (i) reflected rays of the first group of rays that are reflected from the object and (ii) reflected rays of the second group of rays that are reflected from the object, wherein the light-receiving unit further includes:

a lens that is configured to:
receive the reflected rays of the first group of rays and the reflected rays of the second group of rays, and
change respective paths of the reflected rays of the first group of rays and the reflected rays of the second group of rays, and a plurality of photodiodes that are configured to:
accept, from the lens, the reflected rays of the first group of rays and the reflected rays of the second group of rays, and
generate, based on the reflected rays of the first group of rays and the reflected rays of the second group of rays, current signals.

2. The display apparatus of claim 1, wherein the gesture sensing device is located at a first side of the display unit.

3. The display apparatus of claim 1, wherein the first light-emitting device includes:
a first printed circuit board, and
a first group of infrared light sources that are mounted on the first printed circuit board and that are configured to generate the first group of rays,
wherein the second light-emitting device includes:
a second printed circuit board, and
a second group of infrared light sources that are mounted on the second printed circuit board and that are configured to generate the second group of rays, and
wherein the light-receiving unit includes:
a third printed circuit board, and
a plurality of photodiodes that are mounted on the third printed circuit board and that are configured to accept the reflected rays of the first group of rays and the reflected rays of the second group of rays.

4. The display apparatus of claim 3, wherein the gesture sensing device further includes:
a first barrier located between the first group of infrared light sources and the photodiodes, and
a second barrier located between the photodiodes and the second group of infrared light sources.

5. The display apparatus of claim 1, wherein the first light-emitting device includes:
a plurality of infrared light sources that are configured to generate the first group of rays, and
a wedge lens that is configured to receive the first group of rays from the plurality of infrared light sources and change respective paths of the first group of rays.

6. The display apparatus of claim 5, wherein the plurality of infrared light sources include:
a first light source that is configured to generate a first ray in the first group of rays, and
a second light source that is configured to generate a second ray in the first group of rays, and
wherein the wedge lens includes:
a first wedge lens that is configured to change a path of the first ray, and
a second wedge lens that is configured to change a path of the second ray.

7. The display apparatus of claim 6, wherein the processor is configured to:

control the first light source to emit the first ray for a first time period, and
control a second light source to emit the second ray for a second time period.

8. The display apparatus of claim 5, wherein the first light-emitting device further includes:
a beam shaper that is configured to receive the first group of rays from the wedge lens and change energy distribution of each ray of the first group of rays.

9. The display apparatus of claim 8, wherein the first light-emitting device further includes:
a light guide that is configured to receive the first group of rays from the beam shaper and guide the first group of rays toward the object.

10. The display apparatus of claim 1, wherein the second light-emitting device includes:
a plurality of infrared light sources that are configured to generate the second group of rays, and
a wedge lens that is configured to receive the second group of rays from the plurality of infrared light sources and change respective paths of the second group of rays.

11. The display apparatus of claim 10, wherein the plurality of infrared light sources include:
a first light source that is configured to generate a first ray in the second group of rays, and
a second light source that is configured to generate a second ray in the second group of rays, and
wherein the wedge lens includes:
a first wedge lens that is configured to change a path of the first ray, and
a second wedge lens that is configured to change a path of the second ray.

12. The display apparatus of claim 11, wherein the processor is configured to:
control the first light source to emit the first ray for a first time period; and
control the second light source to emit the second ray for a second time period.

13. The display apparatus of claim 1, wherein the light-receiving unit includes:
a light guide that is configured to guide, toward the lens, the reflected rays of the first group of rays and the reflected rays of the second group of rays.

14. The display apparatus of claim 1, wherein the processor is configured to:
control the first light-emitting device to emit the first group of rays for a first time period, and
control the second light-emitting device to emit the second group of rays for a second time period.

15. The display apparatus of claim 1, wherein the light-receiving unit is located between the first light-emitting device and the second light-emitting device.

16. The display apparatus of claim 1, wherein the processor is configured to detect, based on the reflected rays of the first group of rays or the reflected rays of the second group of rays, a 3D gesture of the object about a first axis within a distance between the display unit and the object.

17. The display apparatus of claim 1, wherein the first light-emitting device includes:
a first group of light sources that is configured to generate the first group of rays, and
wherein the processor is configured to detect, based on a determination that the reflected rays of the first group of rays are received, a 3D gesture of the object about a first axis within a distance between the display unit and the object.

18. The display apparatus of claim 17, wherein the second light-emitting device includes:
- a second group of light sources that is configured to generate the second group of rays, and
- wherein the processor is configured to detect, based on a determination that the reflected rays of the second group of rays are received, a 3D gesture of the object about a first axis within a distance between the display unit and the object.

19. The display apparatus of claim 1, further comprising:
a camera that is configured to capture an interior image of the vehicle,
wherein the processor is configured to:
detect one or more objects in the interior image, and
generate a control signal based on the one or more objects in the image.

* * * * *